United States Patent
Ohishi et al.

(10) Patent No.: US 12,553,964 B2
(45) Date of Patent: Feb. 17, 2026

(54) RECEIVING COIL, MAGNETIC RESONANCE IMAGING APPARATUS, AND MODIFIED DIPOLE

(71) Applicant: CANON MEDICAL SYSTEMS CORPORATION, Otawara (JP)

(72) Inventors: Takafumi Ohishi, Yokohama (JP); Sadanori Tomiha, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 335 days.

(21) Appl. No.: 18/347,161

(22) Filed: Jul. 5, 2023

(65) Prior Publication Data

US 2024/0012076 A1    Jan. 11, 2024

(30) Foreign Application Priority Data

Jul. 6, 2022 (JP) .................. 2022-108882
Jun. 27, 2023 (JP) .................. 2023-104828

(51) Int. Cl.
*G01R 33/3415* (2006.01)
*G01R 33/36* (2006.01)

(52) U.S. Cl.
CPC ..... *G01R 33/3415* (2013.01); *G01R 33/3628* (2013.01)

(58) Field of Classification Search
CPC ............... G01R 33/3415; G01R 33/3628
See application file for complete search history.

(56) References Cited

U.S. PATENT DOCUMENTS

| | | |
|---|---|---|
| 10,222,433 B2 | 3/2019 | Leussler et al. |
| 10,483,645 B2 | 11/2019 | Erturk et al. |
| 2007/0216598 A1* | 9/2007 | Fabrega-Sanchez .... H01Q 7/00 343/866 |
| 2013/0057440 A1 | 3/2013 | Brown et al. |
| 2013/0057441 A1 | 3/2013 | Brown et al. |
| 2013/0057442 A1 | 3/2013 | Brown et al. |
| 2015/0164372 A1* | 6/2015 | Navab .................. A61B 5/6847 600/302 |
| 2015/0241528 A1* | 8/2015 | Fackelmeier ...... G01R 33/3657 324/309 |
| 2017/0307701 A1 | 10/2017 | Leussler et al. |
| 2020/0300946 A1 | 9/2020 | Zheng et al. |

(Continued)

FOREIGN PATENT DOCUMENTS

JP    2017-530825 A    10/2017

OTHER PUBLICATIONS

Extended European Search Report issued Nov. 21, 2023, in corresponding European Patent Application No. 23183723.8, 10 pages.

(Continued)

*Primary Examiner* — Gregory H Curran
(74) *Attorney, Agent, or Firm* — Oblon, McClelland, Maier & Neustadt, L.L.P.

(57) ABSTRACT

In one embodiment, a receiving coil includes a plurality of coil elements, wherein: at least one of the coil elements includes a loop coil and a modified dipole disposed inside the loop coil; and the modified dipole includes a main dipole configured to receive a radio-frequency "RF" signal and output a reception signal and a parasitic element that includes a split ring having a gap in part of a ring shape.

19 Claims, 25 Drawing Sheets

(56) References Cited

U.S. PATENT DOCUMENTS

2024/0232568 A1\* 7/2024 Forster .............. B65D 81/3446

OTHER PUBLICATIONS

Xu Kuiwen et al: "Printed multi-band compound meta-loop antenna with hybrid-coupled SRRs", IET Microwaves, Antennas & Propagation, The Institution of Engineering and Technology, United Kingdom, vol. 12, No. 8, Jul. 4, 2018, pp. 1382-1388, XP006067874.

\* cited by examiner

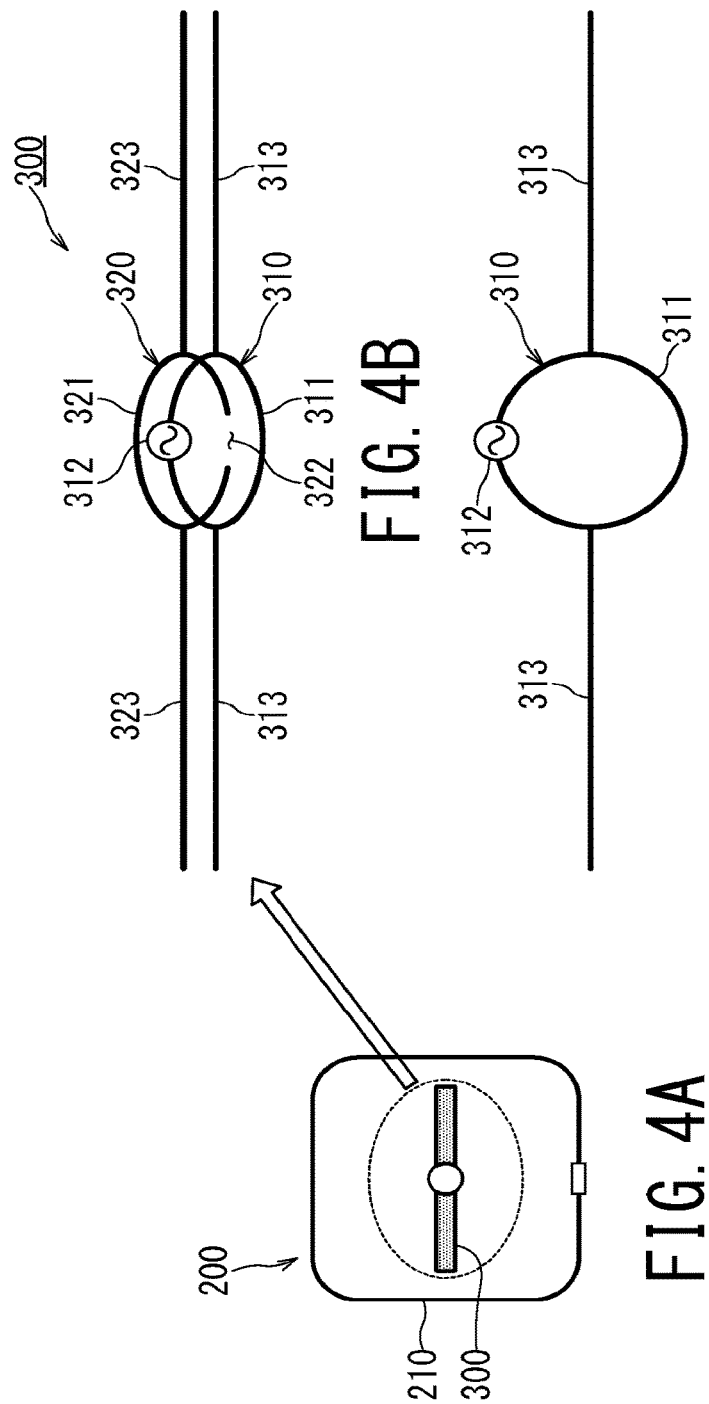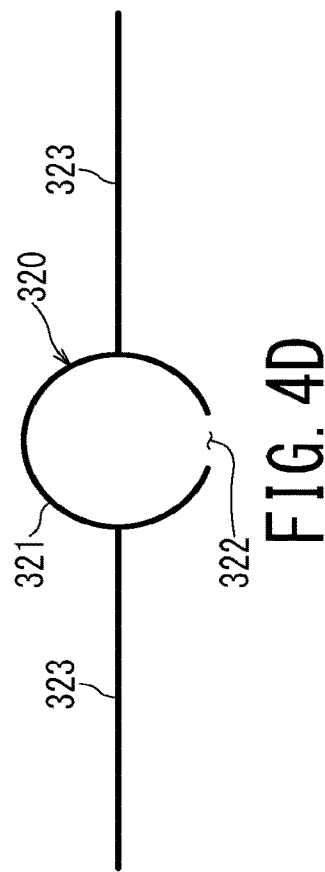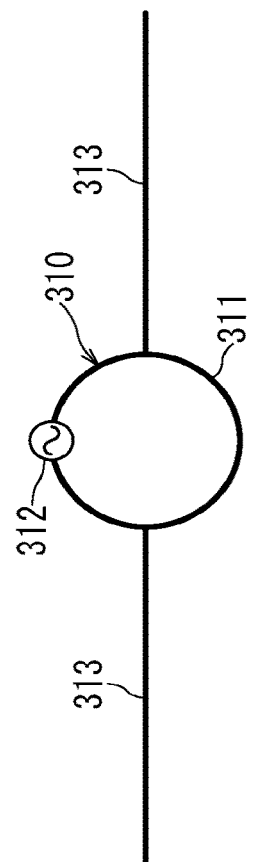

SPLIT RING 321 CONSTITUTES LC PARALLEL RESONANT CIRCUIT AND FUNCTIONS AS BPF. CONSEQUENTLY, EVEN IF STRUCTURE IS SMALL, PARASITIC ELEMENT 320 CAN BE FORCIBLY COUPLED TO MAIN DIPOLE 310 AND FUNCTION AS MATCHING CIRCUIT.

EQUIVALENT CIRCUIT OF SPECIAL DIPOLE ANTENNA OF EMBODIMENT

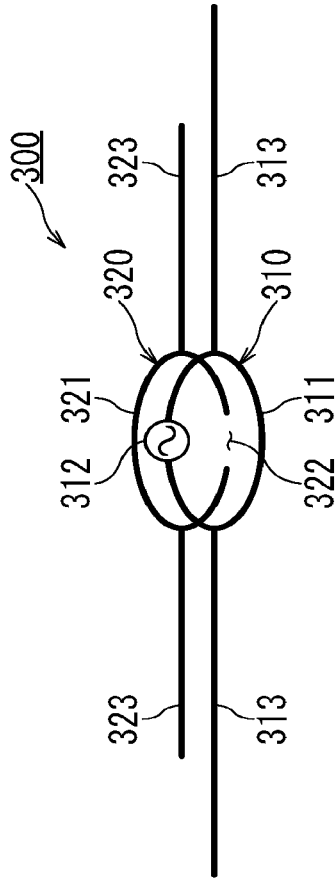
FIG. 7A
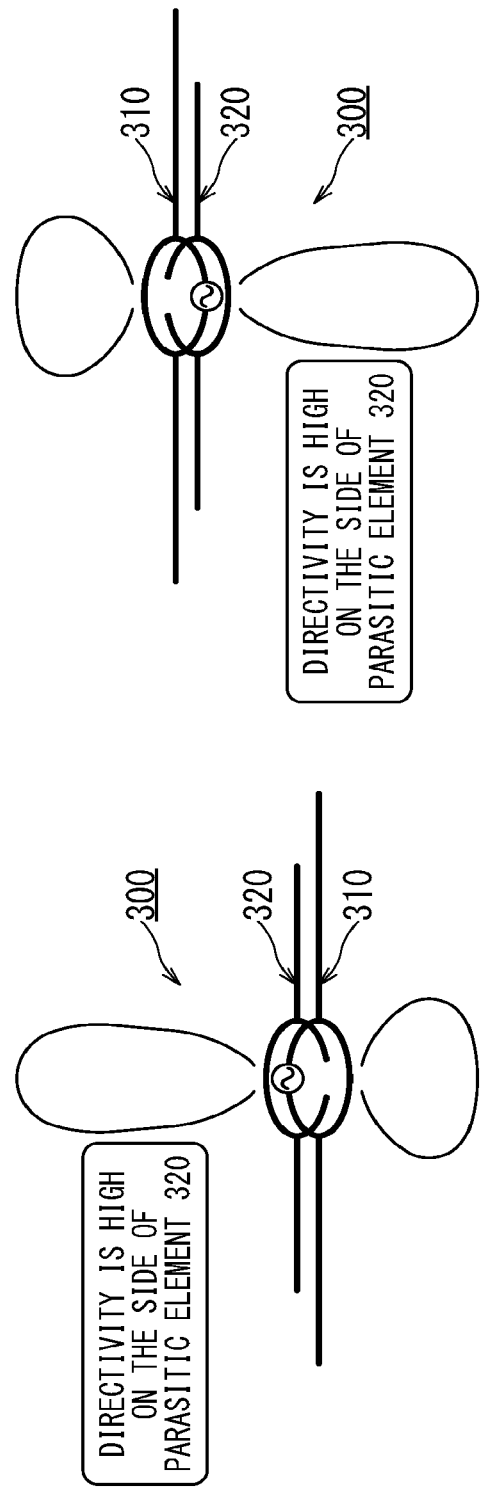
FIG. 7B
FIG. 7C

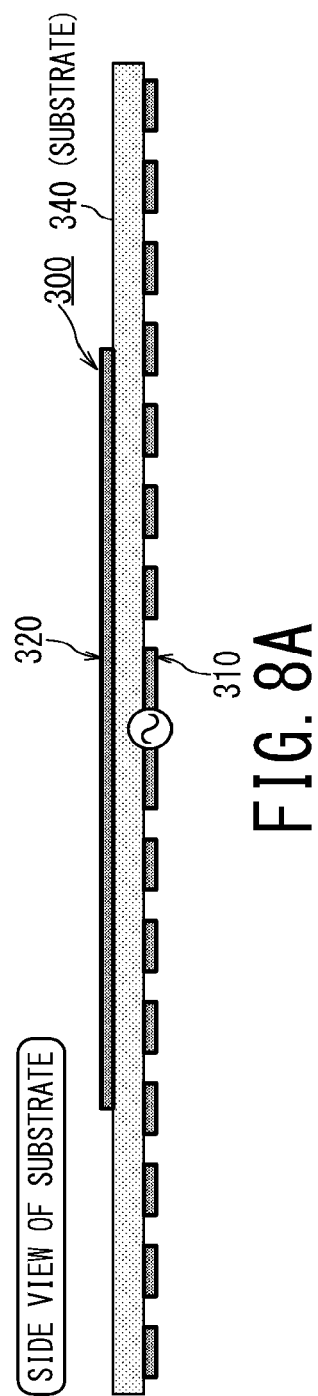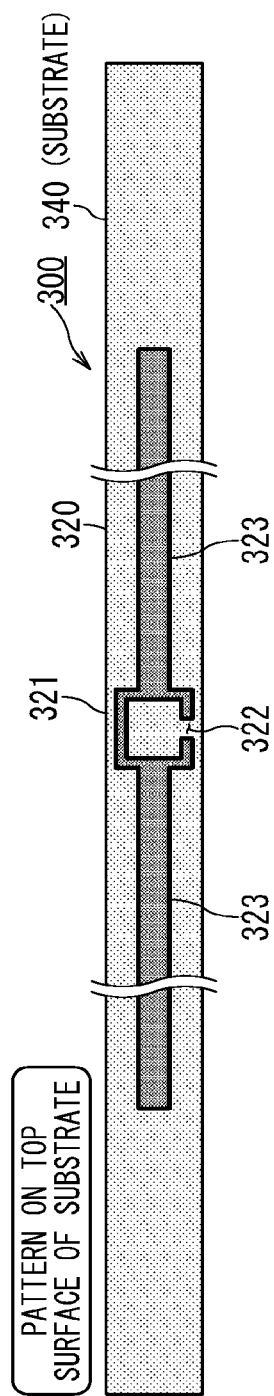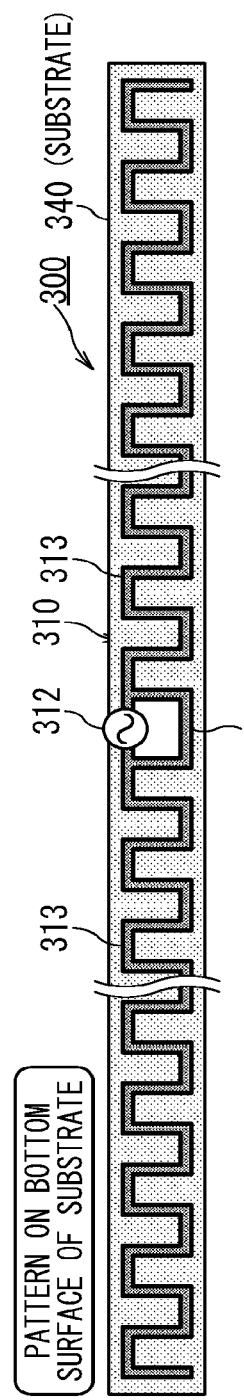

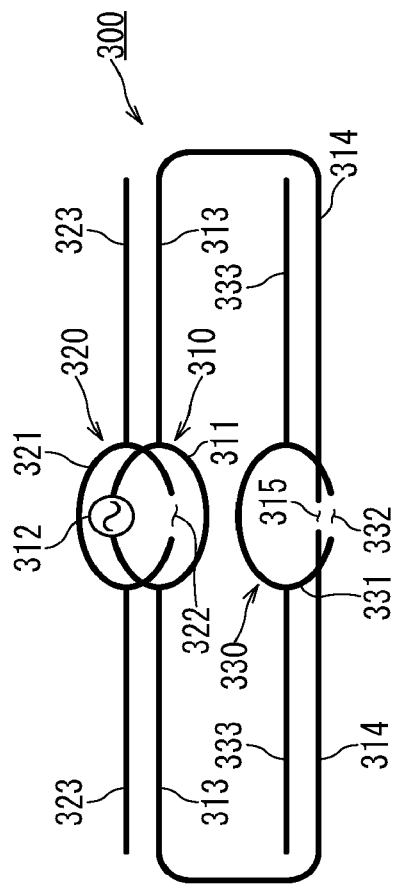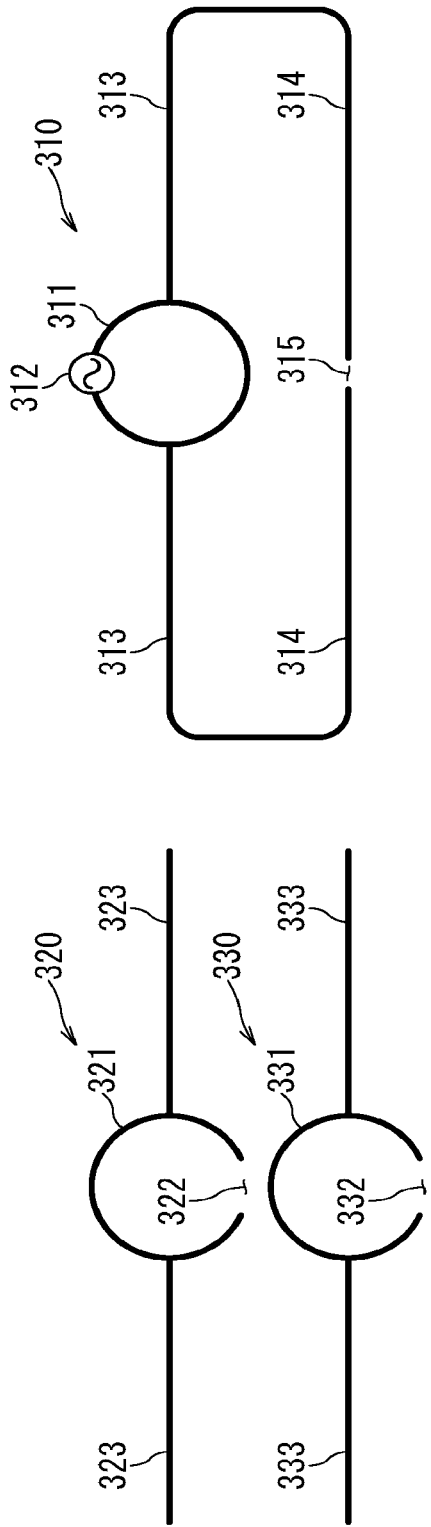

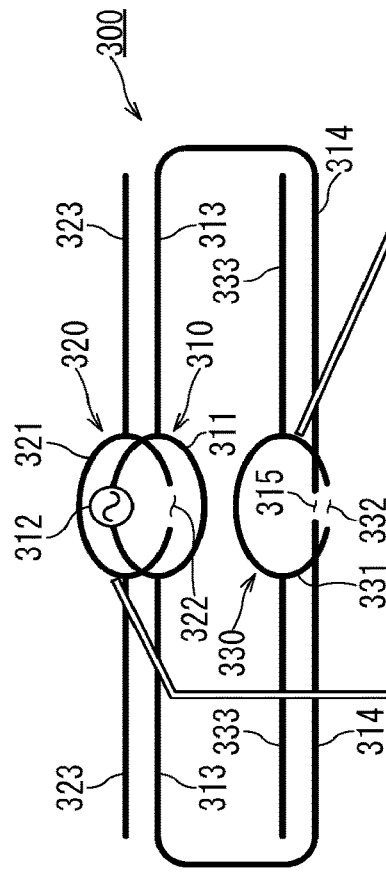

FIG. 13A

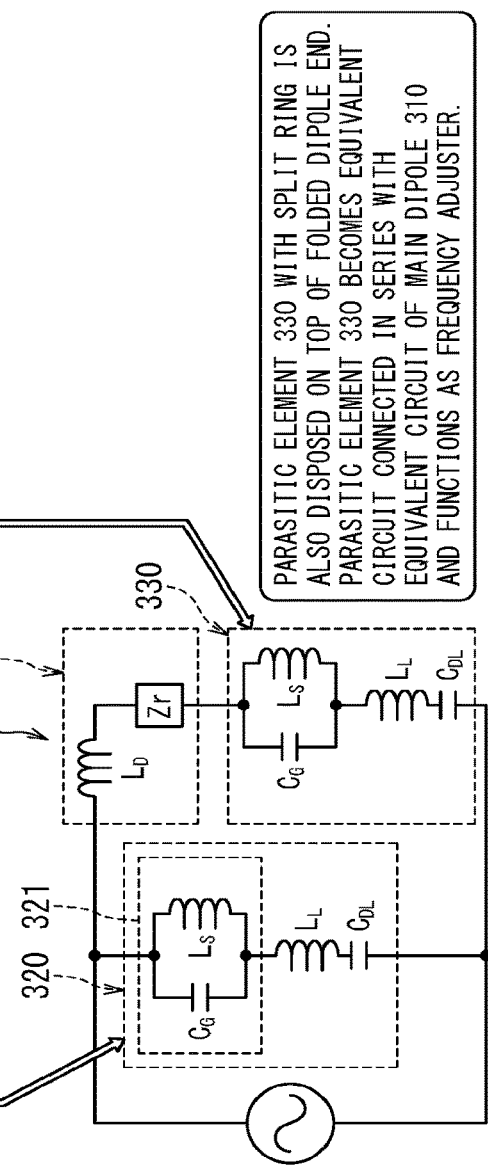

PARASITIC ELEMENT 330 WITH SPLIT RING IS ALSO DISPOSED ON TOP OF FOLDED DIPOLE END. PARASITIC ELEMENT 330 BECOMES EQUIVALENT CIRCUIT CONNECTED IN SERIES WITH EQUIVALENT CIRCUIT OF MAIN DIPOLE 310 AND FUNCTIONS AS FREQUENCY ADJUSTER.

FIG. 13B

EQUIVALENT CIRCUIT OF SPECIAL DIPOLE ANTENNA OF EMBODIMENT $Z_r$: RADIATION RESISTANCE
$L_D$: REACTANCE SPECIFIC TO RADIATING ELEMENT OF MAIN DIPOLE
$L_L$: REACTANCE SPECIFIC TO LINEAR ELEMENT OF PARASITIC ELEMENT
$C_{DL}$: CAPACITANCE BETWEEN RADIATING ELEMENT AND LINEAR ELEMENT
$L_S$: INDUCTANCE OF SPLIT RING
$C_G$: CAPACITANCE DUE TO GAP OF SPLIT RING

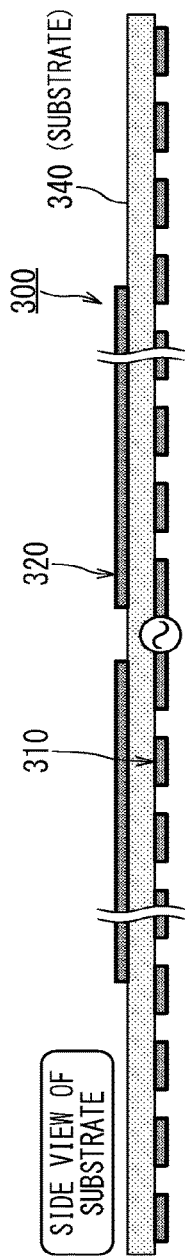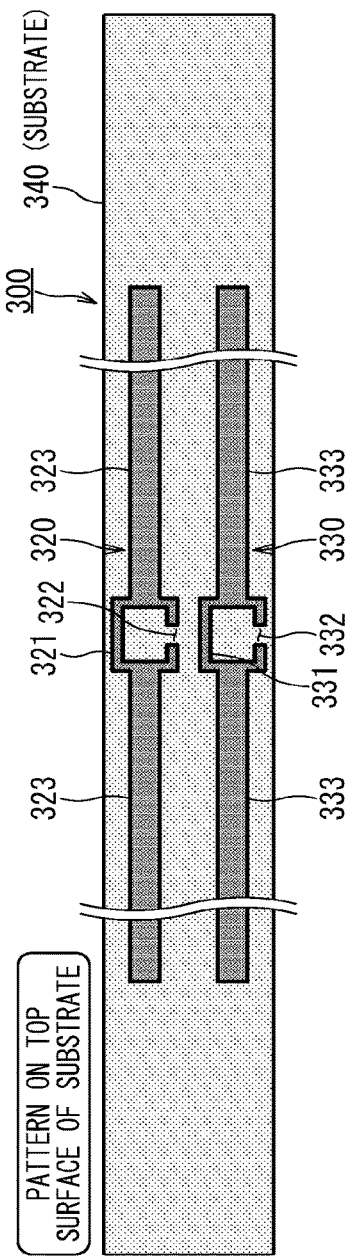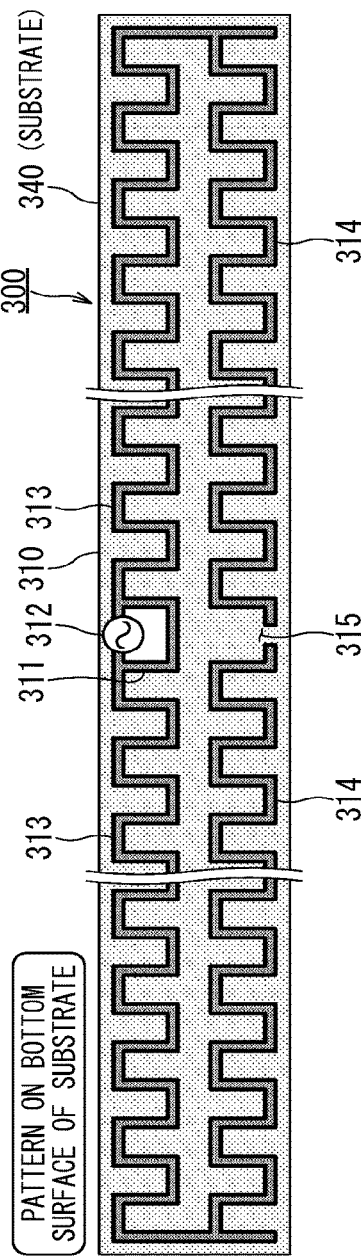

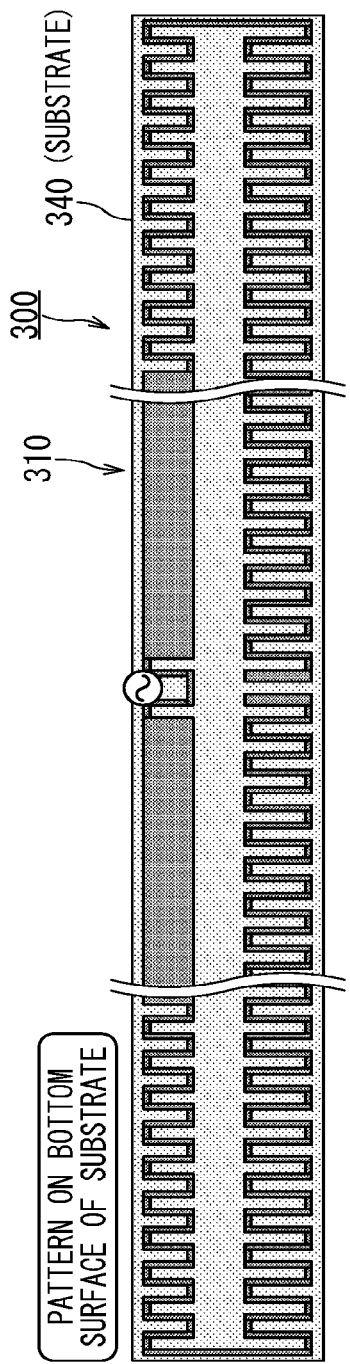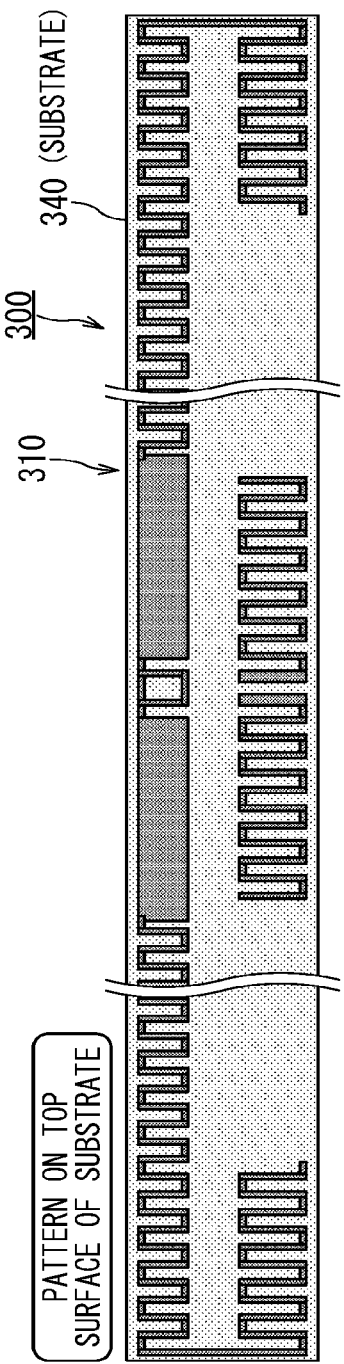

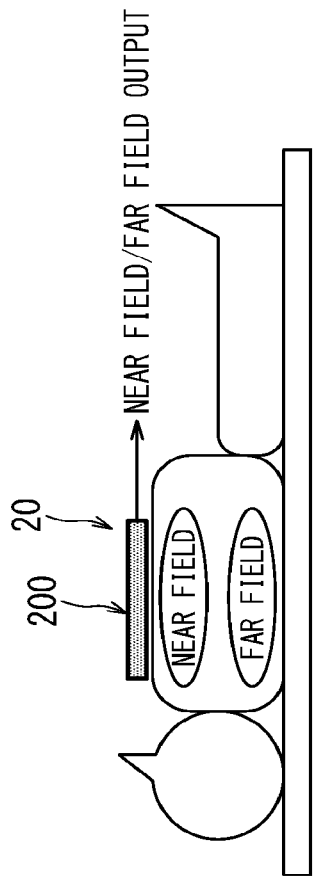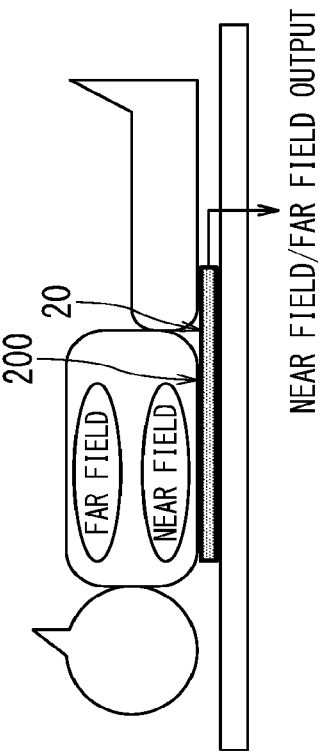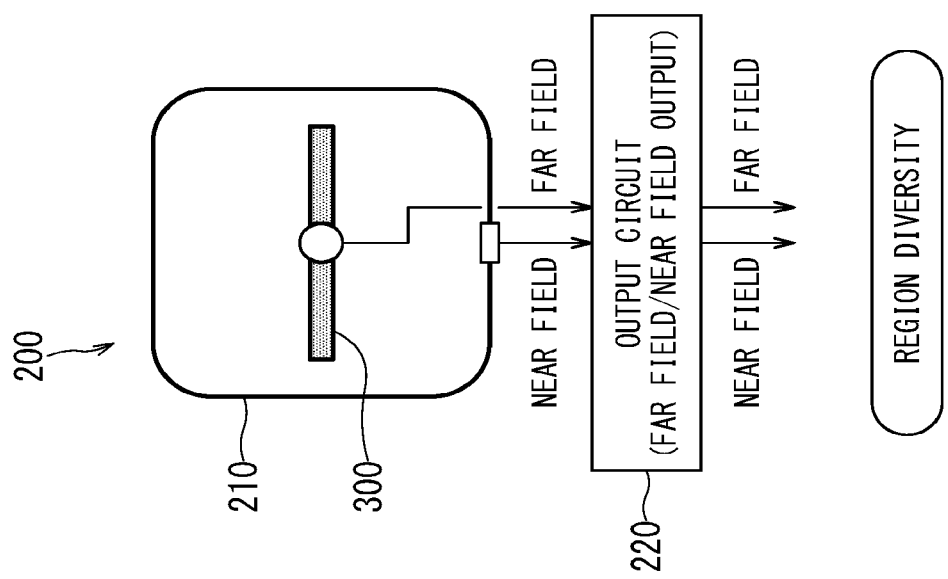

RECEIVING COIL, MAGNETIC RESONANCE IMAGING APPARATUS, AND MODIFIED DIPOLE

CROSS-REFERENCE TO RELATED APPLICATION

This application is based upon and claims the benefit of priority from Japanese Patent Applications No. 2022-108882, filed on Jul. 6, 2022, and No. 2023-104828, filed on Jun. 27, 2023, the entire contents of each of which are incorporated herein by reference.

FIELD

Disclosed Embodiments relate to a receiving coil, a magnetic resonance imaging apparatus, and a modified dipole.

BACKGROUND

A magnetic resonance imaging (MRI) apparatus is an imaging apparatus that magnetically excites nuclear spin of an object placed in a static magnetic field by application of a radio-frequency (RF) signal having the Larmor frequency and reconstructs an image based on magnetic resonance (MR) signals emitted from the object due to the excitation.

Many MRI apparatuses have a configuration called a gantry in which a cylindrical space called a bore is formed. Imaging of an object (for example, a patient) is performed in a state where a table with the object lying thereon is moved into the cylindrical space. Inside the gantry, a cylindrical static magnetic field magnet, a cylindrical gradient coil, and a cylindrical transmitting/receiving coil (i.e., WB (Whole Body) coil) are housed.

When RF pulses are applied to the object by the transmitting/receiving coil, MR signals are emitted from the object due to excitation of hydrogen nuclei in the object. A receiving coil is disposed at a position close to the object, for example, a position close to the chest, the head, or the lower limbs of the object.

The receiving coil for receiving MR signals is often configured as a so-called array coil in which a plurality of loop coils are arranged in an array.

Increase in gain of the receiving coil can be achieved by increasing the number of loop coils included in the receiving coil. However, the size of the receiving coil is restricted by the size of the object and thus cannot be increased that much. Hence, when trying to increase the number of loop coils included in the receiving coil under the restricted dimensions, the diameter of each loop coil inevitably becomes smaller.

However, as the diameter of each loop coil becomes smaller, strength of the magnetic field to be generated by each loop coil becomes weaker. Thus, even when the number of loop coils is increased by reducing each coil diameter, there is still a limit to improving the gain of the receiving coil.

BRIEF DESCRIPTION OF THE DRAWINGS

In the accompanying drawings:

FIG. 4A to FIG. 4D are schematic diagrams illustrating a configuration of a modified dipole according to the first embodiment;

FIG. 7A, FIG. 7B, and FIG. 7C are also schematic diagrams illustrating a configuration of the modified dipole according to the first modification of the first embodiment;

FIG. 8A to FIG. 8C are schematic diagrams illustrating a configuration of the modified dipole according to the second modification of the first embodiment;

FIG. 12A to FIG. 12C are schematic diagrams illustrating a configuration of the modified dipole according to the second embodiment;

FIG. 13A and FIG. 13B are schematic diagrams illustrating an equivalent circuit of the modified dipole according to the second embodiment;

FIG. 14A to FIG. 14C are schematic diagrams illustrating a configuration in which the modified dipole according to the second embodiment is formed on a substrate;

FIG. 17A and FIG. 17B are schematic diagrams illustrating a configuration of the modified dipole according to the third modification of the second embodiment;

FIG. 19A to FIG. 19C are schematic diagrams illustrating the third configuration of the coil element in which the modified dipole and the loop coil are used in combination;

DETAILED DESCRIPTION

Hereinbelow, embodiments of the present invention will be described by referring to the accompanying drawings.

In one embodiment, a receiving coil includes a plurality of coil elements, wherein: at least one of the plurality of coil elements includes a loop coil and a modified dipole disposed inside the loop coil; and the modified dipole includes: a main dipole configured to receive a radio-frequency "RF" signal and output a reception signal, and a parasitic element that includes a split ring having a gap in part of a ring shape.

In the above embodiment, an RF signal received by the main dipole causes a reception signal to be output to an RF receiver. The RF signal, which arises due to the precession of magnetic moments inside an object subjected to MR investigation, induces an electro motive force (EMF) in the main dipole. The parasitic element is configured such that it does not output an RF signal.

MRI Apparatus

Figure 1:
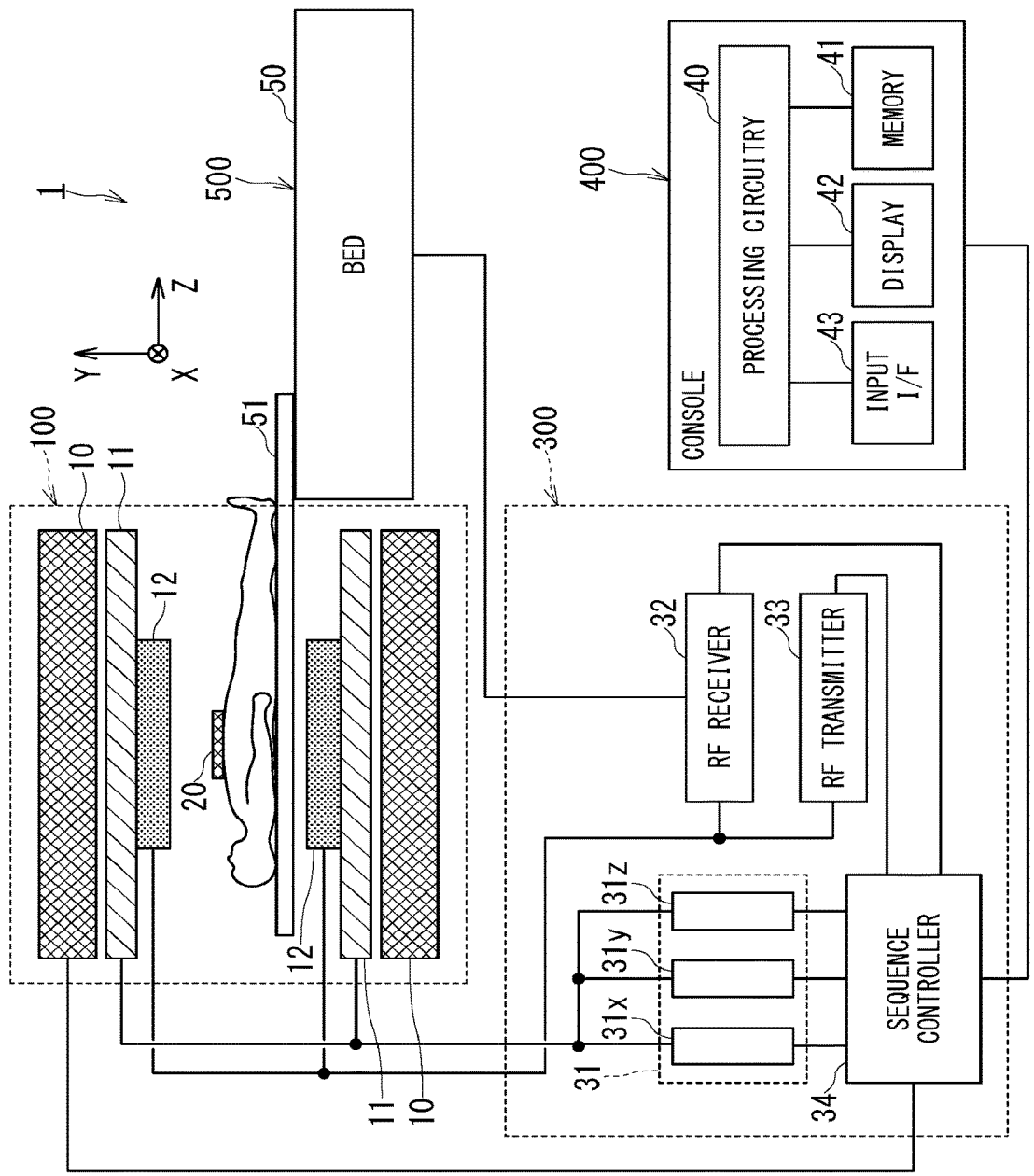
FIG. 1 is a block diagram illustrating an overall configuration of an MRI apparatus provided with a receiving coil according to one embodiment.

FIG. 1 is a block diagram illustrating an overall configuration of an MRI apparatus 1 provided with a receiving coil 20 according to one embodiment. The MRI apparatus 1 includes a gantry 100, a control cabinet 300, a console 400, and a bed 500, for example.

The gantry 100 includes, for example, a static magnetic field magnet 10, a gradient coil 11, and a whole body (WB) coil 12, and these components are housed in a cylindrical housing. The bed 500 includes a bed body 50 and a table 51. The MRI apparatus 1 also includes at least one receiving coil (i.e., local coil or surface coil) disposed close to an object.

The control cabinet 300 includes three gradient coil power supplies 31 (31x for an X-axis, 31y for a Y-axis, and 31z for a Z-axis), an RF receiver 32, an RF transmitter 33, and a sequence controller 34.

The static magnetic field magnet 10 of the gantry 100 is substantially in the form of a cylinder and generates a static magnetic field inside a bore, which is a space inside the cylindrical structure of the static magnetic field magnet and is also an imaging region of an object such as a patient. The static magnetic field magnet 10 includes a superconducting coil inside, and the superconducting coil is cooled down to an extremely low temperature by liquid helium. The static magnetic field magnet 10 generates a static magnetic field by applying an electric current provided from a static magnetic field power supply (not shown) to the superconducting coil in an excitation mode. Afterward, the static magnetic field magnet 10 shifts to a permanent current mode, and the static magnetic field power supply is disconnected. Once it enters the permanent current mode, the static magnetic field magnet 10 continues to generate a strong static magnetic field for a long time, for example, over one year. Note that the static magnetic field magnet 10 may be configured as a permanent magnet.

The gradient coil 11 is also substantially in the form of a cylinder and is fixed to the inside of the static magnetic field magnet 10. This gradient coil 11 applies gradient magnetic fields to the object in the respective directions of the X-axis, the Y-axis, and the Z-axis by using electric currents supplied from the respective gradient coil power supplies 31x, 31y, and 31z.

The bed body 50 of the bed 500 can move the table 51 in the vertical direction and moves the table 51 with the object placed thereon to a predetermined height before imaging. Afterward, when the object is imaged, the bed body 50 moves the table 51 in the horizontal direction so as to move the object to the inside of the bore.

The WB coil 12 is shaped substantially in the form of a cylinder so as to surround the object and is fixed to the inside of the gradient coil 11. The WB coil 12 applies RF pulses transmitted from the RF transmitter 33 to the object, and receives MR signals emitted from the object due to excitation of hydrogen nuclei.

The receiving coil 20 is an RF coil and receives MR signals emitted from the object at a position close to the object. The receiving coil 20 includes a plurality of coil elements 200 (FIG. 3), for example. There are various types of receiving coils 20 depending on the anatomical imaging part of the object, such as the head, the chest, the spine, the lower limbs, and the whole body. FIG. 1 illustrates the receiving coil 20 for imaging the chest.

The RF transmitter 33 transmits each RF pulse to the WB coil 12 based on an instruction from the sequence controller 34. The RF receiver 32 receives MR signals detected by the WB coil 12 and/or the receiving coil 20, and transmits raw data obtained by digitizing the detected MR signals to the sequence controller 34.

The sequence controller 34 performs a scan of the object by driving the gradient coil power supplies 31, the RF transmitter 33, and the RF receiver 32 under the control of the console 400. When the sequence controller 34 receives the raw data acquired by the scan from the RF receiver 32, the sequence controller 34 transmits the raw data to the console 400.

The sequence controller 34 includes processing circuitry (not shown). This processing circuitry is configured as a processor, which executes predetermined programs, or is configured as hardware such as a field programmable gate array (FPGA) and an application specific integrated circuit (ASIC), for example.

The console 400 is configured as a computer that includes processing circuitry 40, a memory 41, a display 42, and an input I/F (interface) 43.

The memory 41 is a recording medium including a read-only memory (ROM) and/or a random access memory (RAM) in addition to an external memory device such as a hard disk drive (HDD) and an optical disc device. The memory 41 stores various programs to be executed by the processor of the processing circuitry 40 as well as various data and information.

The input I/F 43 includes various devices for an operator to input various data and information, and is configured of a mouse, a keyboard, a trackball, and/or a touch panel, for example.

The display 42 is a display device such as a liquid crystal display panel, a plasma display panel, and an organic EL panel.

The processing circuitry 40 is a circuit provided with a central processing unit (CPU) and/or a special-purpose or general-purpose processor, for example. The processor implements various functions described below by executing the programs stored in the memory 41. The processing circuitry 40 may be configured of hardware such as an FPGA and an ASIC. The various functions described below can also be implemented by such hardware. Additionally, the processing circuitry 40 can implement the various functions by combining hardware processing and software processing based on its processor and programs.

Receiving Coil

Figure 2B:
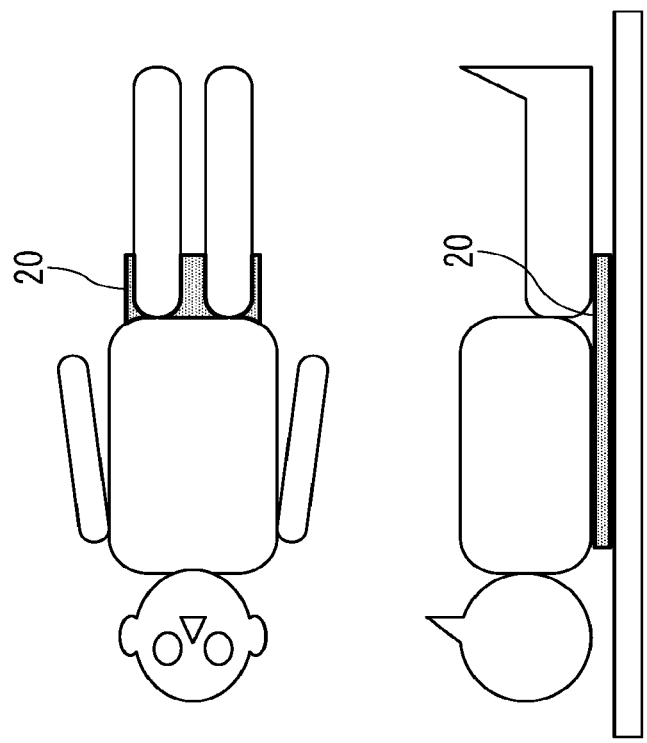
FIG. 2A and FIG. 2B are schematic diagrams illustrating disposition of the receiving coil according to the embodiment.
Figure 2A:
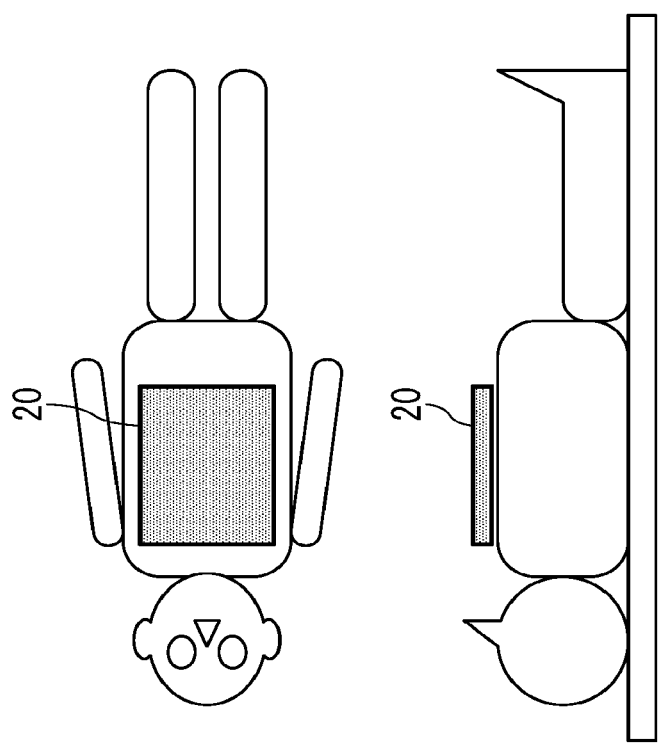

FIG. 2A and FIG. 2B are schematic diagrams illustrating disposition of the receiving coil 20 according to the embodiment. The receiving coil 20 may be configured as a chest coil to be disposed on the chest of the object as illustrated in FIG. 2A or as a spine coil to be disposed between the object and the table as illustrated in FIG. 2B.

Figure 3:
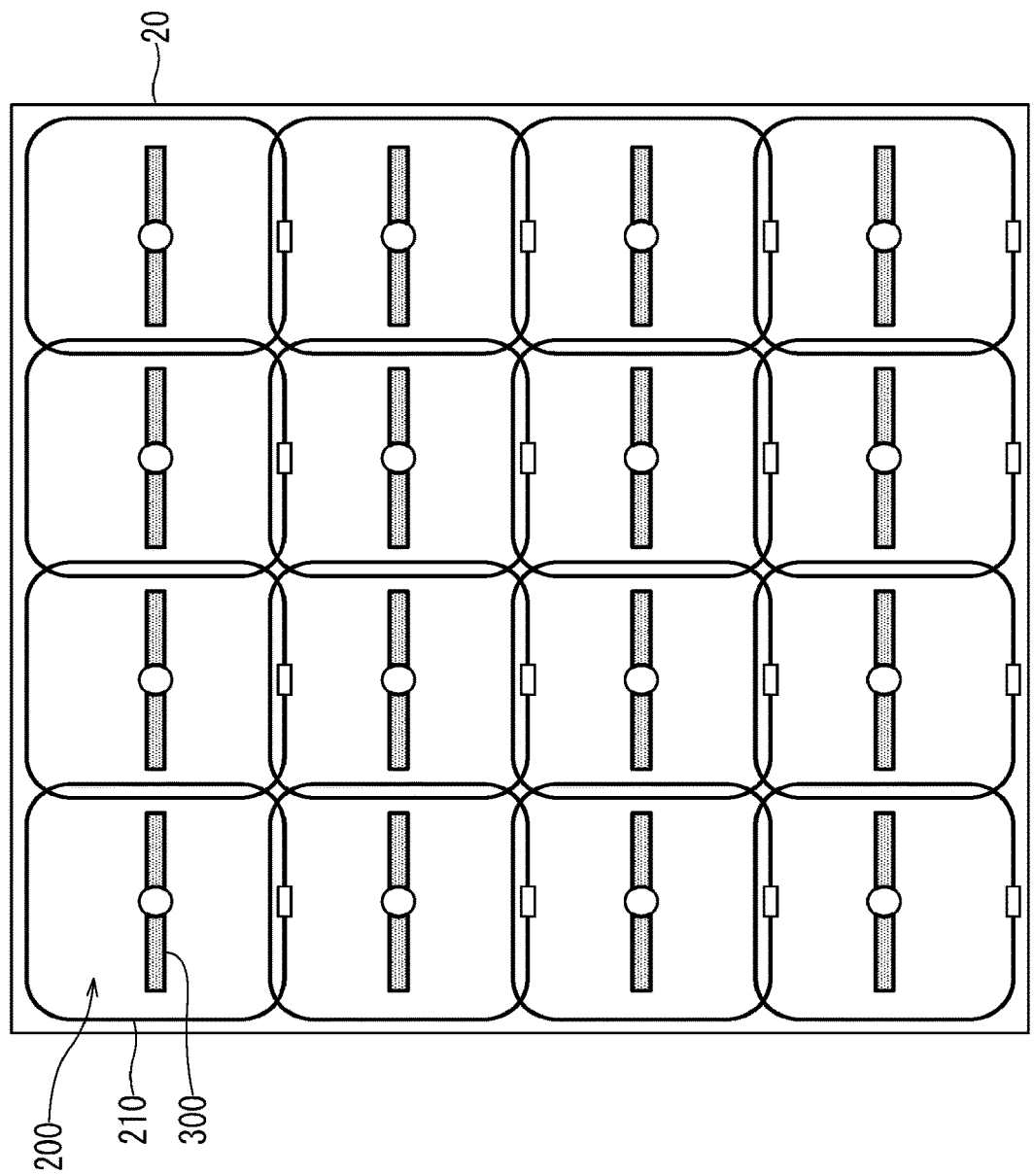
FIG. 3 is an internal plan view schematically illustrating a configuration of the receiving coil 20.

FIG. 3 is an internal plan view schematically illustrating a configuration of the receiving coil 20. As described above, the receiving coil 20 in recent years is generally configured as an array coil in which a plurality of coil elements 200 are arranged in an array. In the aspect shown in FIG. 3, sixteen coil elements 200 are arranged in a planar square array of four columns and four rows.

In particular, in the receiving coil 20 of the embodiment shown in FIG. 3, each of the plurality of coil elements 200 provided in the receiving coil 20 includes a loop coil 210 and a modified dipole 300 disposed inside the loop coil 210.

The modified dipole 300 of the embodiment is a special dipole antenna that is modified based on a dipole antenna, and its configuration and structure will be described below in detail. The main reason for disposing the modified dipole 300 inside the loop coil 210 is to increase the antenna gain of each coil element 200 as described above.

As mentioned above, in order to increase the gain of the receiving coil 20, the number of loop coils included in the receiving coil 20 should be increased. However, the external dimensions of the receiving coil 20 are restricted by the size of the object and thus cannot be made so large. Hence, when trying to increase the number of loop coils included in the receiving coil 20 under the restricted dimensions, the diameter of each loop coil becomes smaller. As the diameter of each loop coil becomes smaller, strength of the magnetic field to be generated by each loop coil becomes smaller. Consequently, even the number of loop coils is increased by making the coil diameter smaller, there is a limit to improving the antenna gain of the receiving coil 20. In other words, when each of the coil elements 200 of the receiving coil 20 is composed only of the loop coil, improvement in antenna gain of the receiving coil 20 is limited.

Thus, in each coil element 200 of the receiving coil 20 of the embodiment, the modified dipole 300 is disposed inside the loop coil 210 and the respective outputs of the loop coil 210 and the modified dipole 300 are combined to increase the antenna gain of the receiving coil 20.

However, length of a radiating element of a normal half-wave dipole antenna is literally about $\lambda/2$ (where A is the wavelength of the frequency to be used). The loop length of the loop coil 210 is usually one wavelength. When the shape of the loop coil 210 is square, the inner dimension of the loop coil 210 (i.e., interval between two opposing sides) is $\lambda/4$. When the shape of the loop coil 210 is a circle, the inner dimension of the loop coil 210 is $\lambda/n$ (approximately $\lambda/3$).

Thus, in order to dispose the dipole antenna inside each loop coil 210, the length of the radiating element of the dipole antenna needs to be considerably shortened, by a large shortening ratio of, for example, 33% or more with respect to $\lambda/2$.

In the conventional technology, for a matching circuit of a dipole antenna, a coil (inductor) and a capacitor are used as lumped-parameter elements. However, when the shortening rate of the dipole antenna increases, the matching circuit requires considerably large values of inductance (L) and/or capacitance (C) of the capacitor. As the inductance (L) and/or capacitance (C) of the capacitor increase, the loss in these lumped-parameter elements increases, and consequently, receiver sensitivity of the dipole antenna is reduced.

Thus, the modified dipole 300 of the embodiment is configured such that impedance matching of a dipole antenna with a radiating element shorter than $\lambda/2$ in length can be achieved without using a coil (inductor) and a capacitor as lumped-parameter elements. This configuration suppresses loss of the dipole antenna, and consequently, the gain of the receiving coil 20 is enhanced.

Modified Dipole of First Embodiment

FIG. 4A to FIG. 4D are schematic diagrams illustrating a configuration of the modified dipole 300 according to the first embodiment. FIG. 4A shows one of the coil elements 200 in the receiving coil 20. As described above, each coil element 200 has the loop coil 210 and the modified dipole 300 disposed inside the loop coil 210.

FIG. 4B is a schematic perspective view illustrating the configuration and structure of the modified dipole 300. The modified dipole 300 includes a main dipole 310 in which an RF signal is induced and then the RF signal is output, and a parasitic element 320 from which any induced RF signal is not output.

FIG. 4C is a schematic plan view illustrating the configuration of only the main dipole 310, and FIG. 4D is a schematic plan view illustrating the configuration of only the parasitic element 320.

Note that, in the field of antennas, there is a reciprocity between a transmitting antenna and a receiving antenna. Thus, in the following description, terms such as "fed", "feeding portion" and "feeding point" are used to indicate that a reception signal produced in the main dipole, due to reception of an RF signal, and the position or portion from which the reception signal is read out from the main dipole to an RF receiver.

As shown in FIG. 4C, the main dipole 310 includes a ring-shaped feeding portion 311 (i.e., a ring-shaped portion 311), and two radiating elements 313 that extend in opposite directions from the respective two points on the feeding portion 311 facing each other. A feeding point 312 (i.e., a read-out point 312) for outputting a received RF signal is provided at one location of the ring-shaped feeding portion 311. Although the shape of the ring-shaped feeding portion 311 is circular in the case of FIG. 4C, it is not limited to the circular shape but may be quadrangular or elliptical, for example.

Each radiating element 313 of the main dipole 310 has a length shorter than half wavelength so as to be accommodated inside the loop coil 210, as described above. Conventionally, impedance matching of such a dipole antenna shorter than half wavelength is achieved by a matching circuit in which an inductor with a large inductance value (L) and/or a capacitor with a large capacitance value (C) are used. By contrast, in the modified dipole 300 of the present embodiment, instead of such a matching circuit using lumped-parameter elements, the parasitic element 320 is provided to function as a matching circuit for the main dipole 310.

The parasitic element 320 is a passive element that is disposed close to the main dipole 310 and has some electromagnetic effect on the main dipole 310.

As shown in FIG. 4D, the parasitic element 320 includes a split ring 321 with a gap 322 in part of its ring shape, and two linear elements 323 that extend in opposite directions from the split ring 321, the two linear elements 323 being arranged in parallel with the radiating elements 313 of the main dipole 310. As described below, the parasitic element 320 may be configured to have only the split ring 321 without the linear elements 323.

Although the shape of the split ring 321 may be circular in the case of FIG. 4D, it is not limited to the circular shape but may be quadrangular or elliptical, for example.

The main dipole 310 and the parasitic element 320 are arranged in such a manner that the ring-shaped feeding portion 311 and the split ring 321 are coaxially stacked with a predetermined gap inbetween. In this arrangement, the feeding portion 311 of the main dipole 310 and the split ring 321 of the parasitic element 320 are coupled to each other by electromagnetic induction.

From the viewpoint of resonating the ring-shaped feeding portion 311 and the split ring 321 and strengthening the coupling between both, a feeding point 312 of the feeding portion 311 is preferably provided at a position where the gap 322 of the split ring 321 being rotated by approximately 180° around a central axis of the feeding portion 311 and the split ring 321.

The size of the split ring 321 may be the same or slightly smaller than the size of the ring-shaped feeding portion 311 of the main dipole 310. Due to such a size relationship between the two, it is possible to limit the target to which the split ring 312 is electromagnetically coupled to the power feeding portion 311 only, and thus, this size relationship ensures that the radiating elements 313 of the main dipole 310 do not interfere with the coupling between the feeding portion 311 and the split ring 321.

In the modified dipole 300 described above, the parasitic element 320 and the main dipole 310 are arranged so as to be perpendicular to the same plane, and the parasitic element 320 and the main dipole 310 have symmetrical structures with respect to their respective centers.

In the modified dipole 300 described above, the main dipole 310 and the parasitic element 320 are perpendicular to the same plane and orthogonal to the same straight line on the same plane, the main dipole 310 is point-symmetric with respect to a first point on this same straight line, and the parasitic element 320 is point-symmetric with respect to a second point different from the first point on this same straight line.

Figure 5A:
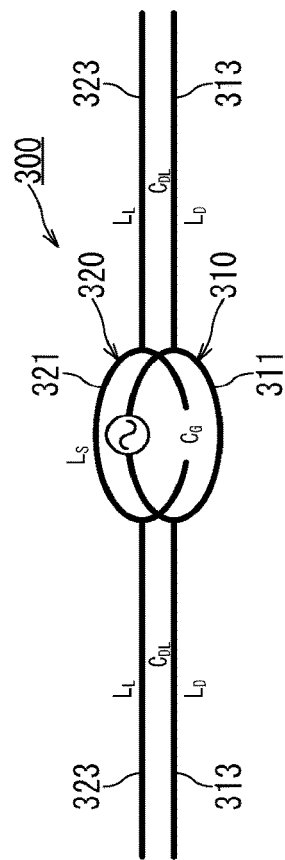
FIG. 5A and FIG. 5B are schematic diagrams illustrating an equivalent circuit of the modified dipole according to the first embodiment.
Figure 5B:
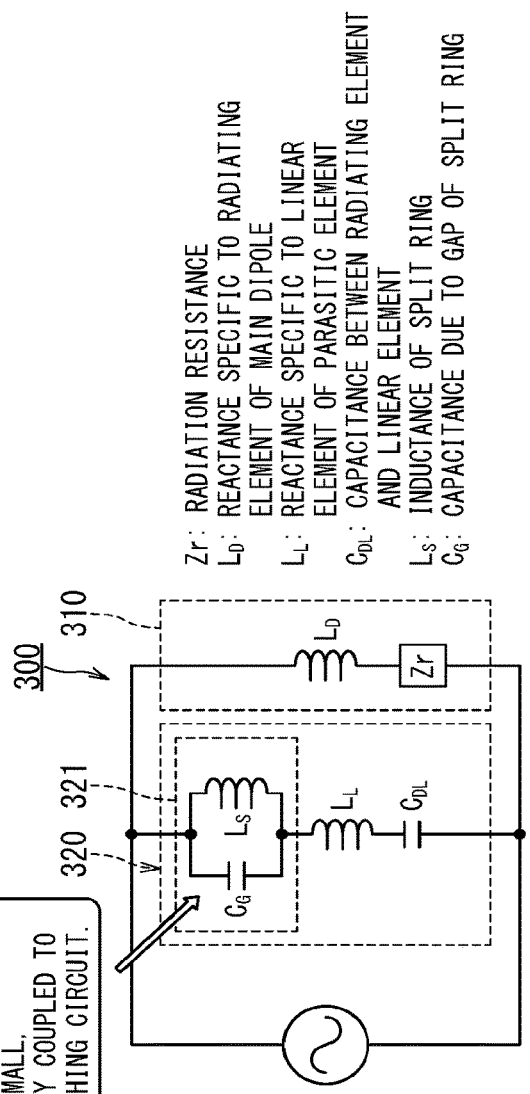

FIG. 5B illustrates an equivalent circuit of the above-described modified dipole 300. FIG. 5A is the same diagram as FIG. 4B.

In FIG. 5B, $Z_r$ is the radiation resistance, $L_D$ is the reactance specific to the radiating element 313 of the main dipole 310, $L_L$ is the reactance specific to the linear element 323 of the parasitic element 320, $C_{DL}$ is the capacitance between the radiating element 313 and the linear element 323, $L_S$ is the inductance of the split ring 321, and $C_G$ is the capacitance due to the gap of the split ring 321.

As can be understood from FIG. 5B, the split ring 321 constitutes an LC parallel resonance circuit composed of the capacitance $C_G$ due to the gap of the split ring 321 and the inductance $L_S$ of the split ring 321, and functions as a BPF (bandpass filter). As a result, even if the structure is small in size, the parasitic element 320 can be forcibly coupled to the main dipole 310, and the parasitic element 320 can function as a matching circuit.

Modification of First Embodiment

FIG. 6A to FIG. 7B are schematic diagrams illustrating a configuration of the modified dipole according to the first modification of the first embodiment.

Figure 6A:
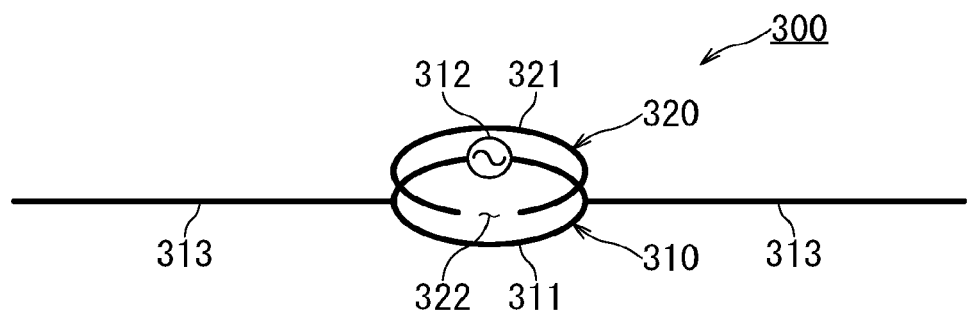
FIG. 6A and FIG. 6B are schematic diagrams illustrating a configuration of the modified dipole according to the first modification of the first embodiment.

As shown in FIG. 6A, the parasitic element 320 can be configured of only the split ring 321 without the linear elements 323. Further, as shown in FIG. 6B, the entire length of the two linear elements 323 of the parasitic element 320 can be shorter than the entire length of the two radiating elements 313 of the main dipole 310.

As shown in FIG. 7A to FIG. 7C, when the entire length of the linear elements 323 of the parasitic element 320 is formed to be shorter than the entire length of the radiating elements 313 of the main dipole 310, the parasitic element 320 can act as a wave director for the main dipole 310.

Figure 6B:
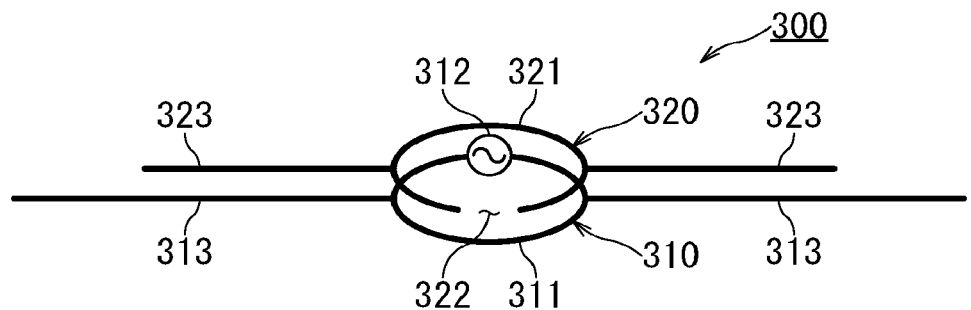

FIG. 7A is the same as FIG. 6B. As shown in FIG. 7B and FIG. 7C, in this modified dipole 300, the parasitic element 320 functions as a wave director, and thus, the directivity in the direction from the main dipole 310 toward the parasitic element 320 is enhanced.

The above-described properties are used in the following manner, for example. When attaching the receiving coil 20 to the object, of both faces of the receiving coil 20, the face closer to the parasitic element 320 (i.e., the face towards which the directivity is enhanced) is provided to face the object, which enables reception of the MR signals emitted from the object with higher sensitivity.

FIG. 8A to FIG. 9B are schematic diagrams illustrating a configuration of the modified dipole according to the second modification of the first embodiment.

The modified dipole 300 of the second modification of the first embodiment is configured as a plate-shaped dipole antenna formed on a substrate 340. In this modified dipole 300 shown in FIG. 8A to FIG. 8C, the main dipole 310 is formed on one surface of the substrate 340, and the parasitic element 320 is formed on the other surface (opposite to the one surface) so as to be insulated from the conductors of the main dipole 310.

In the modified dipole 300 of the second modification, the conductor constituting each radiating element 313 of the main dipole 310 may be configured as a solid-pattern surface or each radiating element 313 of the main dipole 310 may be formed in a meander shape as shown in FIG. 8C.

When the radiating elements 313 are formed in a meander shape, the entire length of the radiating elements 313 (i.e., the direct distance between both ends of the radiating elements 313) can be shortened.

The meander shape is a shape in which a thin conductor with width sufficiently narrower than the width of the planar main dipole 310 in the lateral direction is folded or bent at a plurality of positions into a crank shape.

The parasitic element 320 of the modified dipole 300 of the second modification has two linear elements 323 that extend in opposite directions from the split ring 321 and are disposed so as to be in parallel with the radiating elements 313 of the main dipole 310, as shown in FIG. 8B. Although the length of each linear element 323 in the longitudinal direction is not limited to a specific value, each linear element 323 is formed to be shorter than the length of each radiating element 313 in the longitudinal direction in the case of FIG. 8B.

As shown in FIG. 8B, the shape of the split ring 321 in the parasitic element 320 of the modified dipole 300 of the second modification is rectangular or square rather than circular. Correspondingly, the shape of the feeding portion 311 of the main dipole 310 is not circular but rectangular or square (FIG. 8C).

Figure 9A:
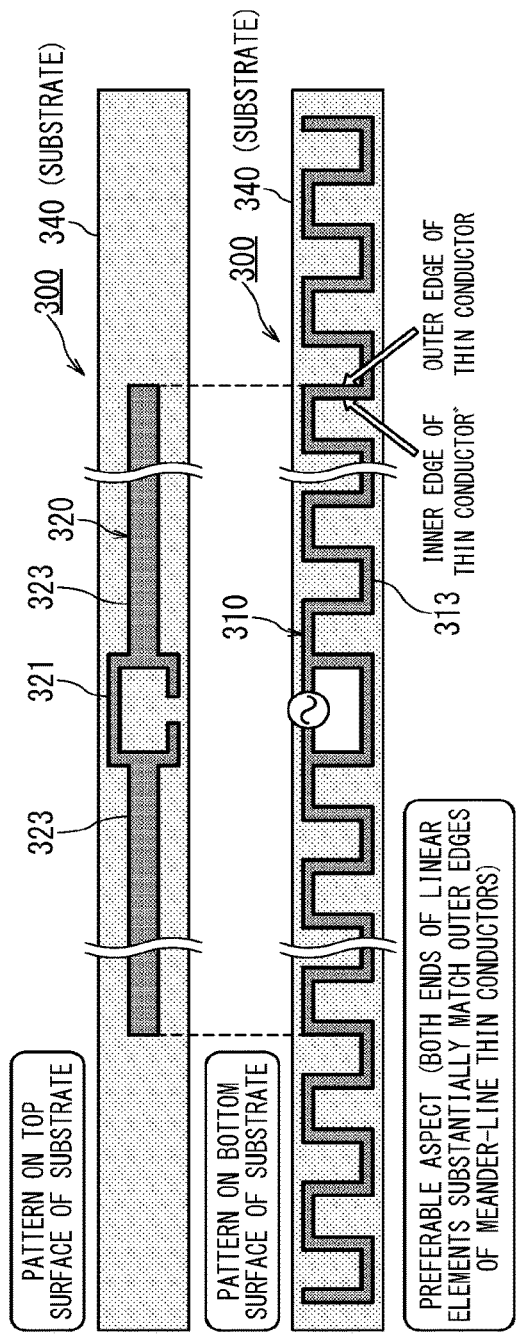
FIG. 9A and FIG. 9B are also schematic diagrams illustrating a configuration of the modified dipole according to the second modification of the first embodiment.
Figure 9B:
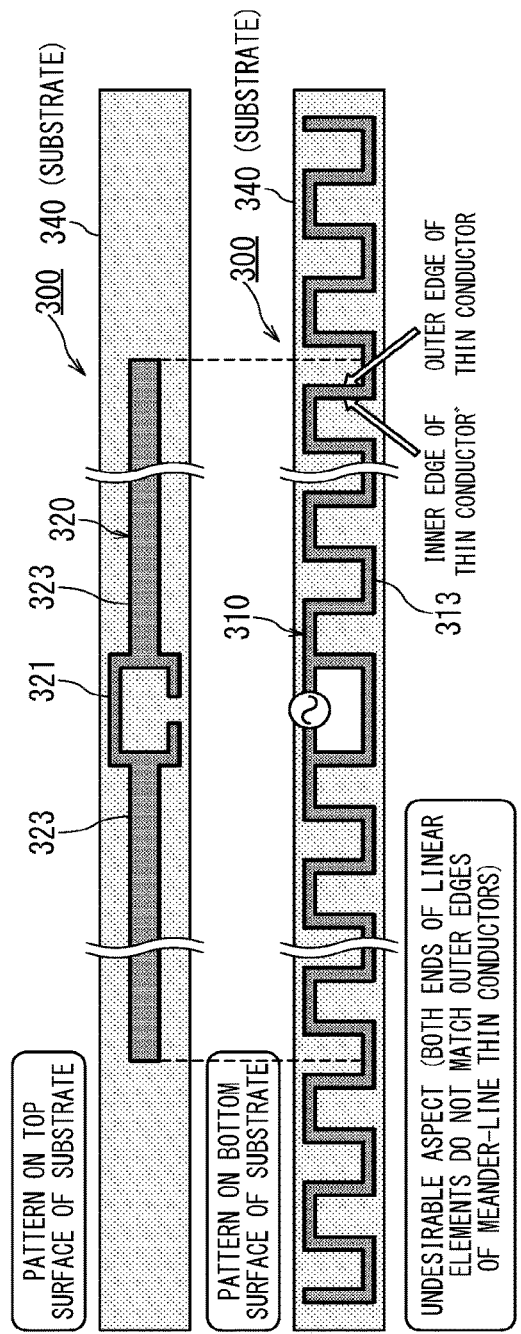

FIG. 9A and FIG. 9B respectively illustrate a preferable aspect and an undesirable aspect regarding the length of each linear element 323 in the longitudinal direction.

Specifically, as shown in FIG. 9A, the linear elements 323 are preferably formed in such a manner that both ends of the entirety of the two linear elements 323 substantially match the positions of two outer edges of the thin conductors, among the outer edges and inner edges of the respective thin conductors parallel to the lateral direction of the main dipole 310. This is because the effect of the inductance (L) of the parasitic element 320 can be readily predicted by setting the entire length of the linear elements 323 in the above-described manner.

As shown in FIG. 9B, when both ends of the entirety of the linear elements 323 do not match the outer edges of the thin conductors, such a configuration is undesirable. For example, as shown in FIG. 9B, when the position of each of both ends of the linear elements 323 fall between the outer edge and the inner edge of the thin conductor, the effect of the inductance (L) of the parasitic element 320 is difficult to be predicted, and thus, such a configuration is undesirable.

As described above, the parasitic element 320 functions as a matching circuit for the main dipole 310. In this case, the capacitance C of the matching circuit is adjusted by the width of each linear element 323 of the parasitic element 320 and the size of the gap 322 of the split ring 321, and the inductance L of the matching circuit is adjusted by the length of each linear element 323.

FIG. 10A to FIG. 11B are schematic diagrams illustrating several modifications, in each of which the main dipole 310 and the parasitic element 320 are formed in a plate shape.

So far, although a description has been given of the case where both the main dipole 310 and the parasitic element 320 are in a linear or rectangular shape, they are not limited to a linear or rectangular shape.

For example, the surface on which the main dipole 310 is disposed and the surface on which the parasitic element 320 is disposed are arranged to be in parallel with each other. Under this condition, the main dipole 310 can be formed into a line-symmetric shape with respect to the line of intersection of a first plane on which the main dipole 310 is disposed and a second plane that includes the feeding point and is perpendicular to the first plane. In addition, the parasitic element 320 can be formed into a line-symmetric shape with respect to the line of intersection of a third plane on which the parasitic element 320 is disposed and a fourth plane that includes the feeding point and is perpendicular to the third plane. These symmetric structures are preferred for the following reason. When the shapes of the main dipole 310 and the parasitic element 320 are bilaterally asymmetric, the symmetry of the antenna is lost, which makes it difficult to achieve impedance matching of the antenna with respect to the characteristic impedance of the transmission line (typically ohms), for example.

Figure 10A:
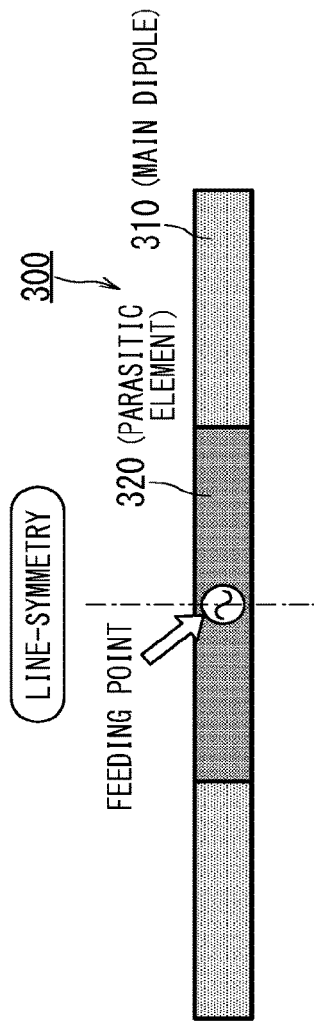
FIG. 10A to FIG. 10C are schematic diagrams illustrating three modifications, in each of which the main dipole and the parasitic element are formed in a plate shape.
Figure 10B:
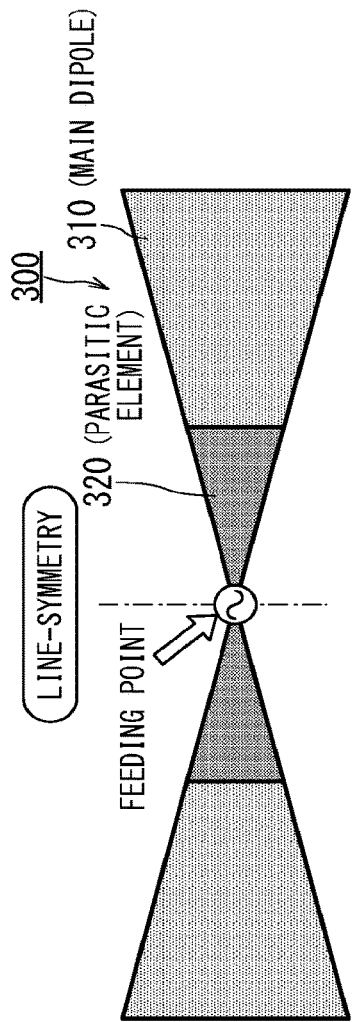
Figure 10C:
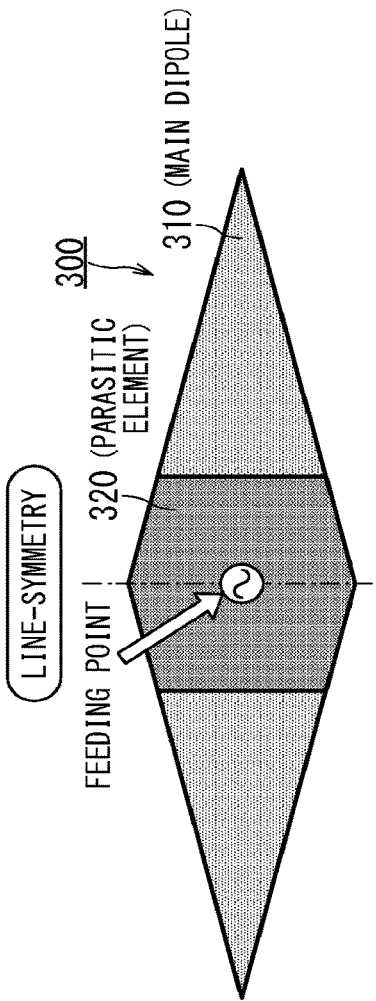

FIG. 10A to FIG. 10C illustrate some embodiments in which the respective shapes of the main dipole 310 and the parasitic element 320 are line-symmetric as described above. In FIG. 10A to FIG. 10C, the meander-shaped conductor pattern is omitted. FIG. 10A illustrates a shape corresponding to the second modification of the first embodiment.

FIG. 10B illustrates an embodiment in which the main dipole 310 is configured as a so-called bow-tie antenna, and the shape of the parasitic element 320 is similar to the shape of the main dipole 310. FIG. 10C illustrates an embodiment in which the shape of the main dipole 310 is inverted from the shape of the bow-tie antenna and the feeding point is provided on the base side of the isosceles triangle.

On the other hand, the respective shapes of the main dipole 310 and the parasitic element 320 can be point-symmetric with respect to the feeding point to form a planar antenna. More specifically, a first plane on which the main dipole 310 is disposed and a second plane on which the parasitic element 320 is disposed are arranged to be in parallel with each other. Under this condition, the main dipole 310 can be formed into a point-symmetric shape with respect to the point of intersection of the first plane and the straight line that includes the feeding point and is orthogonal to the first plane. In addition, the parasitic element 320 can be formed into a point-symmetric shape with respect to the point of intersection of the second plane and the straight line that includes the feeding point and is orthogonal to the second plane.

Figure 11A:
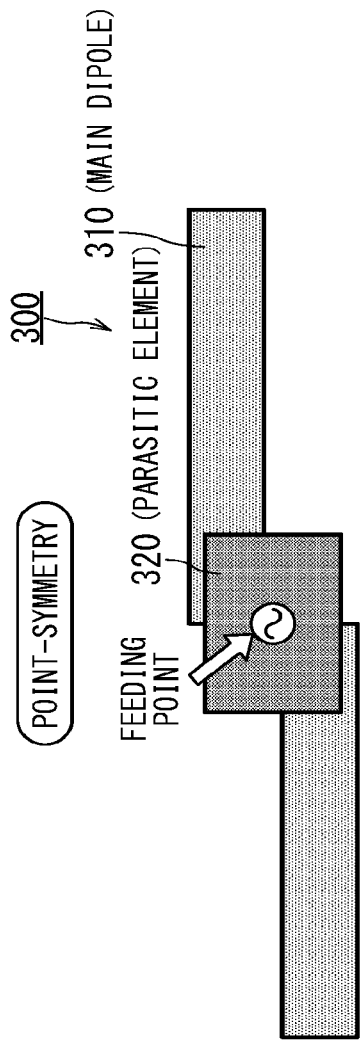
FIG. 11A and FIG. 11B are schematic diagrams illustrating other two modifications, in each of which the main dipole and the parasitic element are formed in a plate shape.
Figure 11B:
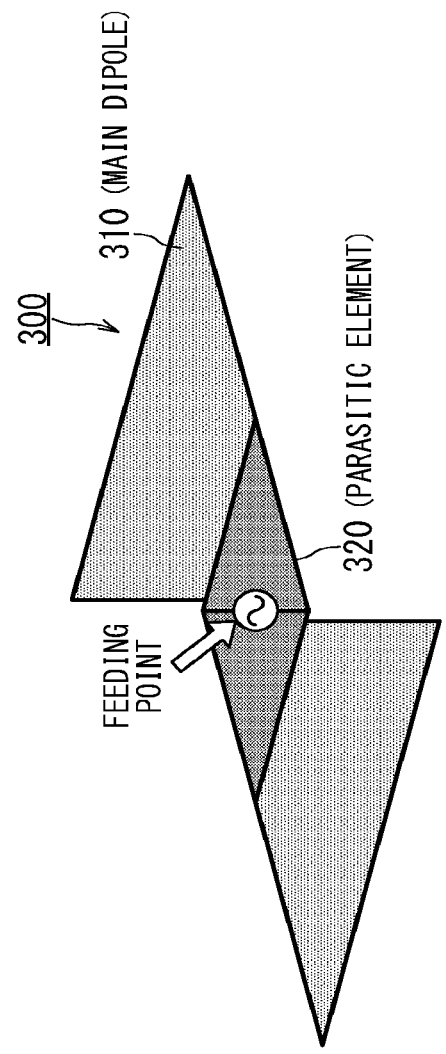

FIG. 11A and FIG. 11B illustrate two embodiments in which the respective shapes of the main dipole 310 and the parasitic element 320 are point-symmetric with respect to the feeding point. In FIG. 11A and FIG. 11B, the meander-shaped conductor pattern is omitted. FIG. 11A illustrates an embodiment in which the radiating elements on the right and left of the rectangular planar main dipole 310 are arranged stepwise so as to form a point-symmetric shape with respect to the feeding point. The parasitic element 320 is disposed near the feeding point so as to cover the feeding point and so as to overlap the region near the feeding point of the right and left radiating elements. FIG. 11B illustrates an embodiment in which the right and left radiating elements in its isosceles-triangle shape are arranged stepwise, and the right and left radiating elements are arranged to be point-symmetric with respect to the feeding point.

Modified Dipole of Second Embodiment

FIG. 12A is a schematic perspective view illustrating a configuration of the modified dipole 300 according to the second embodiment. In the modified dipole 300 of the second embodiment, the main dipole 310 is configured as a folded dipole antenna.

As shown in FIG. 12A and FIG. 12C, the main dipole 310 of the second embodiment has the ring-shaped feeding portion 311 similarly to the first embodiment. As to the radiating elements, the main dipole 310 includes two first radiating elements 313 that extend in opposite directions from the feeding portion 311, and two second radiating elements 314 folded back at both ends of the first radiating elements 313. The two second radiating elements 314 folded back at both ends are approximately in parallel with the first radiating elements 313 and directed toward the feeding portion 311, and the ends of the two second radiating elements 314 face each other with a predetermined gap 315 inbetween near the feeding portion 311.

The modified dipole 300 of the second embodiment includes a first parasitic element 320 corresponding to the first radiating elements 313, and a second parasitic element 330 corresponding to the second radiating elements 314, as shown in FIG. 12A and FIG. 12B. The first parasitic element 320 has a first split ring 321 and two linear elements 323 that extend from the first split ring 321 toward both sides. The first split ring 321 has a first gap 322 that partially interrupts its ring shape.

Similarly, the second parasitic element 330 has a second split ring 331 and two linear elements 333 that extend from the second split ring 331 toward both sides. The second split ring 331 also has a second gap 332 that partially interrupts its ring shape.

The first split ring 321 of the first parasitic element 320 is disposed so as to face the feeding portion 311 of the main dipole 310. The second split ring 331 of the second parasitic element 330 is disposed so as to face the gap 315 where both ends of the second radiating elements 314 face each other.

FIG. 13B illustrates an equivalent circuit of the modified dipole 300 according to the second embodiment. FIG. 13A is the same diagram as FIG. 12A.

In the equivalent circuit of FIG. 13B, Z r is the radiation resistance, $L_D$ is the reactance specific to the first and second radiating elements 313 and 314 of the main dipole 310, $L_L$ is the reactance specific to the linear element 323 of the first parasitic element 320 and the linear element 333 of the second parasitic element 330, $C_{DL}$ is the capacitance between the first radiating element 313 and the linear element 323, and between the second radiating element 314 and the linear element 333, $L_S$ is the inductance of the first and second split rings 321 and 331, and $C_G$ is the capacitance due to the gaps 322 and 332 of the respective split rings 321 and 331.

As shown in FIG. 13B, the equivalent circuit of the first parasitic element 320 is connected in parallel with the equivalent circuit of the main dipole 310. The first parasitic element 320 functions as a matching circuit for the main dipole 310 similarly to the first embodiment.

The equivalent circuit of the second parasitic element 330 is connected in series with the equivalent circuit of the main dipole 310. The second parasitic element 330 mainly functions as a frequency adjustment circuit for the main dipole 310.

The first parasitic element 320 and the second parasitic element 330 have different functions as described above, and thus, between the two parasitic elements 320 and 330, the respective split rings 321 and 331 can be different in size and the linear elements 323 and 333 can be different in size.

FIG. 14A to FIG. 14C are schematic diagrams illustrating a modification where the modified dipole 300 of the second embodiment is formed by etching a conductor, for example, while the main dipole 310 and the parasitic elements 320 and 330 are formed and mounted on the substrate 340.

In the modified dipole 300 of the second embodiment as shown in FIG. 14A to FIG. 14C, the main dipole 310 is formed on one surface of the substrate 340 (for example, on the bottom surface of the substrate 340), and the two parasitic elements 320 and 330 are formed on the opposite surface of the substrate 340 (for example, on the top surface of the substrate 340) so as to be insulated from the conductors of the main dipole 310.

In the modified dipole 300 of the second embodiment, the conductors constituting the radiating elements 313 and 314 of the main dipole 310 are formed as meander lines, similarly to the second modification of the first embodiment. For example, as shown in FIG. 14C, from the feeding portion 311 to both fold-back positions, and from both fold-back positions to the gap 315 where both ends face each other, the thin conductors are folded or bent at a plurality of positions into a crank shape so as to be formed as meander lines. This structure can shorten the length of the radiating elements 313 and 314 of the main dipole 310.

Figure 15A:
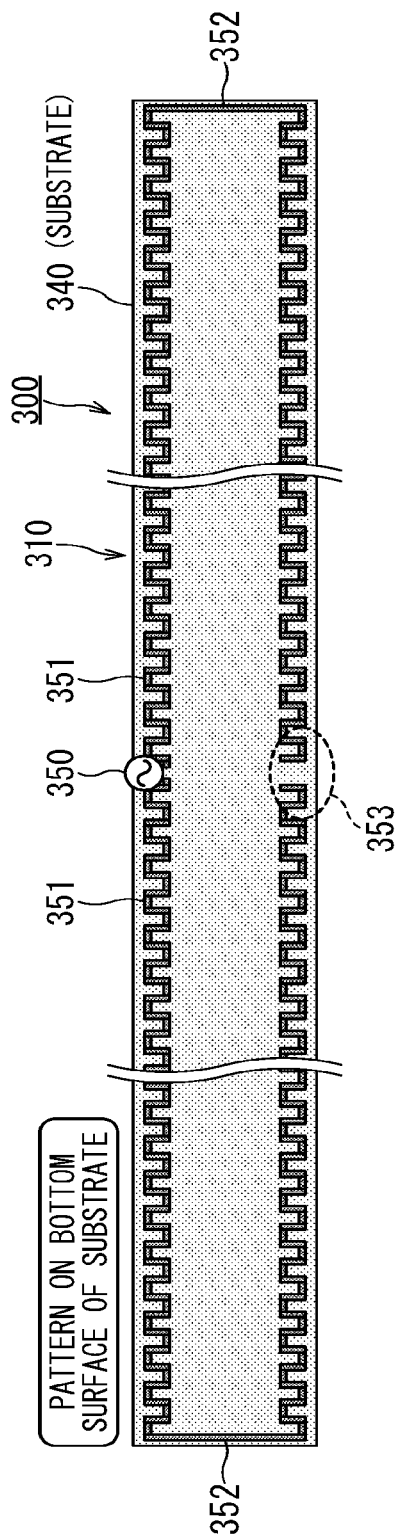
FIG. 15A and FIG. 15B are schematic diagrams illustrating a configuration of the modified dipole according to the first modification of the second embodiment.
Figure 15B:
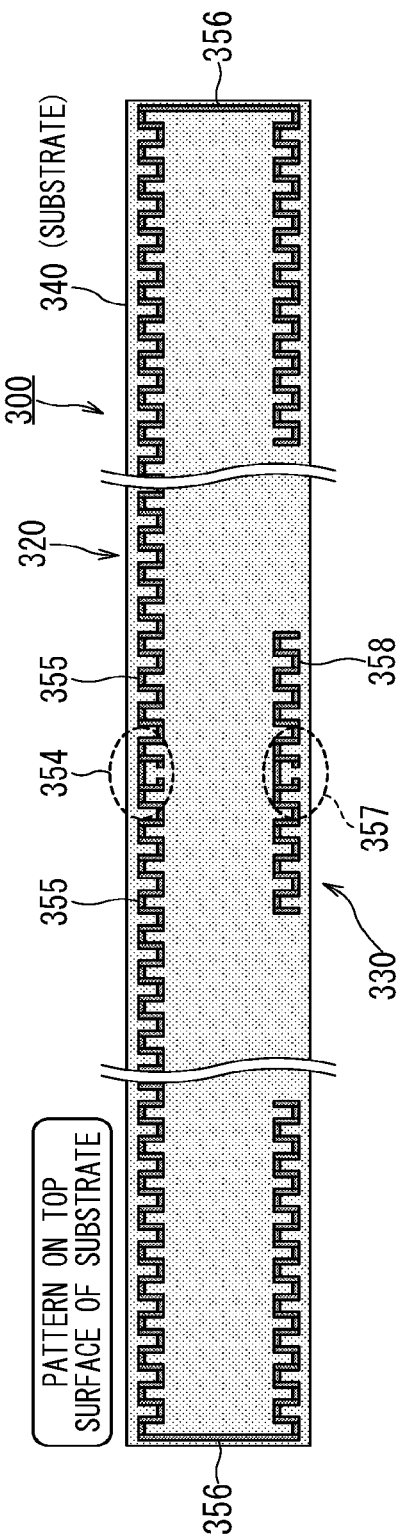

FIG. 15A and FIG. 15B are schematic diagrams illustrating a configuration of the modified dipole 300 according to the first modification of the second embodiment. In the first modification of the second embodiment, the conductors are subjected to a process such as etching so as to form the main dipole 310 on one surface of the substrate 340 (for example, the bottom surface of the substrate 340), similarly to the embodiment shown in FIG. 14A to FIG. 14C. On the opposite surface of the substrate 340 (for example, the top surface of the substrate 340), the first parasitic element 320 and the second parasitic element 330 are formed so as to be insulated from the conductors of the main dipole 310.

Both radiating elements 351 of the main dipole 310 are formed as meander lines, in each of which a thin conductor is folded at a plurality of positions into a crank shape, from the feeding portion 350 to both fold-back positions 352 and from both fold-back positions 352 to both ends 353 facing each other.

Each of the first and second parasitic elements 320 and 330 are formed as a meander line, different from the embodiment shown in FIG. 14A to FIG. 14C. Specifically, the first parasitic element 320 has a split ring 354 at the position corresponding to the feeding portion 350 of the main dipole 310. Further, the first parasitic element 320 is formed as meander lines 355 in the range from the split ring 354 to both fold-back positions 356 and from both fold-back positions 356 to the predetermined positions toward the center. The second parasitic element 330 has a split ring 357 at the position corresponding to both ends 353 of the main dipole 310, and meander lines 358 of the second parasitic element 330 extend in both directions from the split ring 357.

In the first modification of the second embodiment, not only the main dipole 310 but also the first and second parasitic elements 320 and 330 are formed as meander lines. Thus, the capacitance between the main dipole 310 and the first and second parasitic elements 320 and 330 can be increased, and consequently, size of the modified dipole 300 can be reduced or the frequency of the modified dipole 300 can be lowered.

Figure 16A:
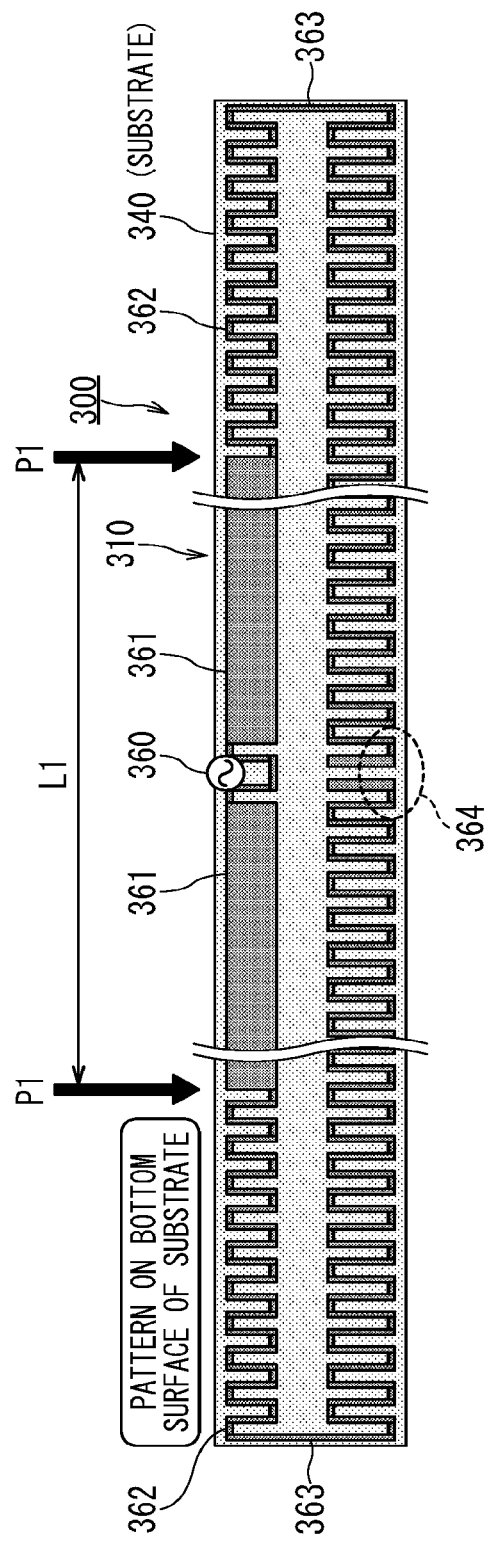
FIG. 16A and FIG. 16B are schematic diagrams illustrating a configuration of the modified dipole according to the second modification of the second embodiment.
Figure 16B:
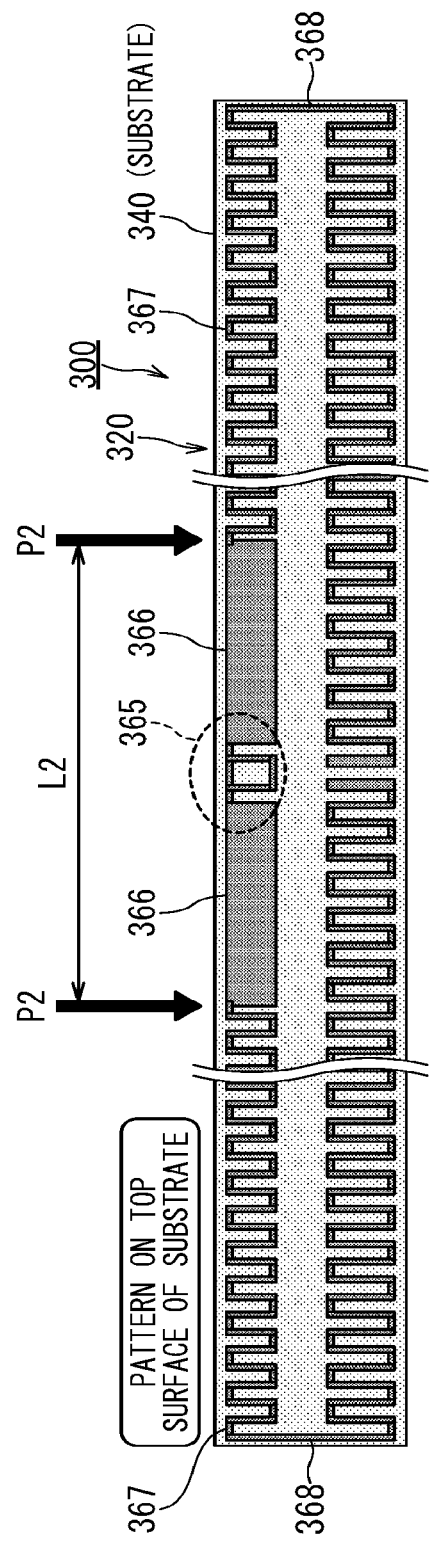

FIG. 16A and FIG. 16B are schematic diagrams illustrating a configuration of the modified dipole 300 according to the second modification of the second embodiment. In the second modification of the second embodiment, the main dipole 310 is formed on one surface of the substrate, and the parasitic element 320 is formed on the opposite surface so as to be insulated from the conductors of the main dipole 310, similarly to the above-described first modification.

In the second modification, the radiating elements of the main dipole 310 are formed as first linear elements 361 with a predetermined length from the feeding portion 360 to both first intermediate positions P1 toward both fold-back positions 363, and are formed as meander lines, in each of which a thin conductor is folded at a plurality of positions into a crank shape, from the first intermediate positions P1 to both fold-back positions 363 and from both fold-back positions 363 to both ends 364 that face each other.

The parasitic element 320 is formed in a shape approximately similar to each radiating element of the main dipole 310. Specifically, the parasitic element 320 extends from the split ring 365 in opposite directions and is folded back at both fold-back positions 368 such that both ends of the parasitic element 320 face each other near the split ring 365. The parasitic element 320 is formed as the second linear elements 366 with a predetermined length from the split ring 365 to both second intermediate positions P2 toward both fold-back positions 368, and are formed as meander lines, in each of which a thin conductor is folded at a plurality of positions into a crank shape, from both second intermediate positions P2 to both fold-back positions 368 and from both fold-back positions 368 to both ends that face each other.

In the second modification, the portion of the main dipole 310 from the feeding portion 360 to the first intermediate positions P1 is not formed as a meander line but formed as the linear elements 361 with a predetermined length L1, and similarly, the portion of the parasitic element 320 from the split ring 365 to the second intermediate positions P2 is not formed as a meander line but formed as the linear elements 366 with a predetermined length L2. Hence, the configuration of the second modification can further increase the capacitance between the main dipole 310 and the parasitic element 320 as compared with the first modification, and consequently, the size of the modified dipole 300 can be further reduced or the frequency of the modified dipole 300 can be further lowered.

Note that the frequency can be finely tuned by setting the length L1 of the first linear elements 361 of the main dipole 310 to be longer than the length L2 of the second linear elements 366 of the parasitic element 320, and adjusting the length L2 of the second linear element 366 of the parasitic element 320.

FIG. 17A and FIG. 17B are schematic diagrams illustrating a configuration of the modified dipole 300 according to the third modification of the second embodiment. The third modification is an embodiment that is a combination of the first modification and the second modification.

FIG. 18A to FIG. 19C illustrate other aspects of the coil elements 200, in each of which the modified dipole 300 and the loop coil 210 according to the above-described embodiments and modifications are applied in combination.

Figure 18B:
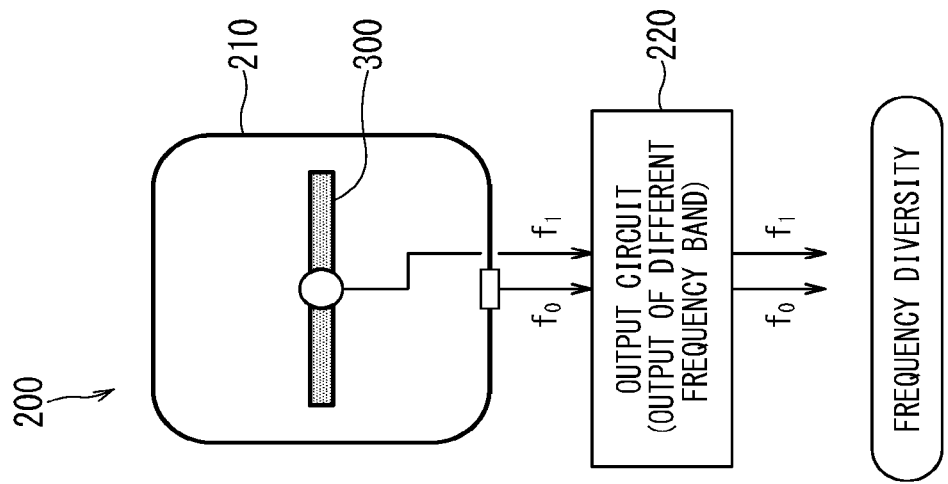
FIG. 18B is a schematic diagram illustrating the second configuration of the coil element in which the modified dipole and the loop coil are used in combination.
Figure 18A:
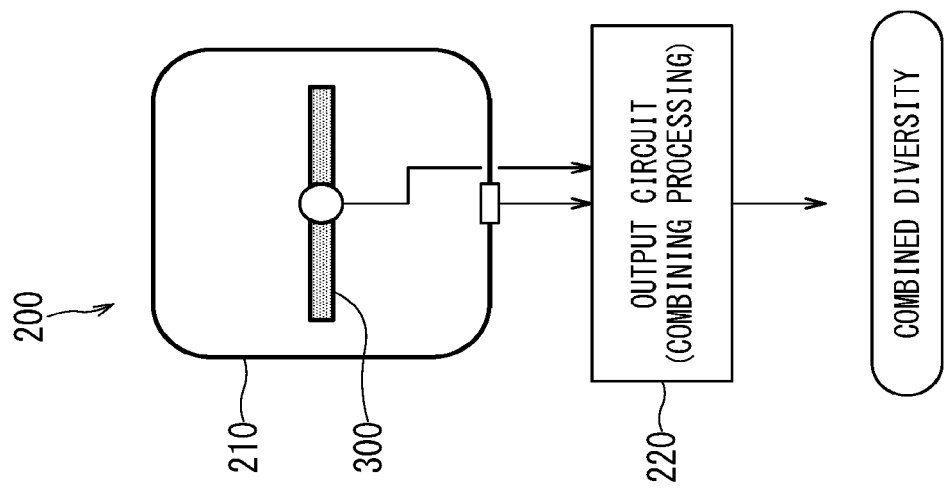
FIG. 18A is a schematic diagram illustrating the first configuration of the coil element in which the modified dipole and the loop coil are used in combination.

FIG. 18A schematically illustrates a first configuration of the coil element 200. The first configuration is provided with an output circuit 220 that combines and outputs the output of the loop coil 210 and the output of the modified dipole 300. The respective outputs from the plurality of coil elements 200 may be further combined to be used as the detected signal of the entirety of the receiving coil 20. Additionally or alternatively, one or more outputs may be selected from the outputs of the respective coil elements 200 depending on the needs to be used as the detected signal of the entirety of the receiving coil 20. Such a configuration enables the receiving coil 20 to function as a combined diversity coil.

FIG. 18B schematically illustrates a second configuration of the coil element 200. The second configuration is provided with an output circuit 220 that outputs both the output of the loop coil 210 and the output of the modified dipole 300 as signals of different frequency bands. For example, the output circuit 220 outputs a signal in the first frequency band f0 from the loop coil 210, and outputs a signal in the second frequency band f1 from the modified dipole 300. The outputs from the respective coil elements 200 may be combined for each frequency band to be used as the detected signal of the entirety of the receiving coil 20. Additionally or alternatively, for each frequency band, one or more outputs may be selected from the outputs of the respective coil elements 200 depending on the needs to be used as the detected signal of the entirety of the receiving coil 20. Such a configuration enables the receiving coil 20 to function as a frequency diversity coil.

This receiving coil 20 can be used as, for example, a receiving coil for MR signals from different types of nuclides and can also be used as a receiving coil of an open-type MRI apparatus in which the static magnetic field strength varies depending on the imaging position.

FIG. 19A schematically illustrates a third configuration of the coil element 200. The third configuration is provided with an output circuit 220 that outputs both the output of the loop coil 210 and the output of the modified dipole 300 as signals from different regions.

In general, a loop coil functions as a parallel resonant circuit and is more sensitive to signals from the near field than signals from the far field. Conversely, a dipole antenna functions as a series resonant circuit and is more sensitive to signals from the far field than signals from the near field. On the basis of such properties, in the output circuit 220 of the third configuration, the signal from the modified dipole 300 is outputted as the signal from the far field, and the signal from the loop coil 210 is outputted as the signal from the near field.

For each region in the far field or in the near field, the respective outputs from the plurality of coil elements 200 may be combined to be used as the detected signal of the entirety of the receiving coil 20. Additionally or alternatively, for each region in the far field or in the near field, one or more outputs may be selected from the outputs of the respective coil elements 200 depending on the needs to be used as the detected signal of the entirety of the receiving coil 20. Such a configuration enables the receiving coil 20 to function as a region diversity coil.

For example, in the case of using this receiving coil 20 as a chest coil or abdominal coil as shown in FIG. 19B, the output signal from the loop coil 210 is mainly the signal from the front region (i.e., ventral-side or anterior) of the object, and the output signal from the modified dipole 300 is mainly the signal from the rear region (i.e., back-side or posterior) of the object.

In the case of using this receiving coil 20 as a spine coil as shown in FIG. 19C, the output signal from the loop coil 210 is mainly the signal from the rear region (i.e., back-side or posterior) of the object, and the output signal from the modified dipole 300 is mainly the signal from the front region (i.e., ventral-side or anterior) of the object.

In addition, the modified dipole 300 according to each embodiment or each modification can be used alone, instead of being applied in combination with the loop coil 210. As described above, the modified dipole 300 according to each embodiment or each modification can achieve a matching circuit, which is required when shortening the length of the radiating element than half wavelength, by using a low-loss parasitic element 320 without using a large-loss lumped-parameter element.

Thus, the modified dipole 300 according to each embodiment or each modification can also be used independently as a small-size and low-loss dipole antenna.

Modifications of Receiving Coil

So far, a description has been given of the case where the modified dipole 300 provided in the receiving coil 20 is disposed inside the loop coil 210 as illustrated in FIG. 3. In other words, a description has been given of the receiving coil 20 in which the length of the modified dipole 300 in the longitudinal direction is shorter than the interval between two opposing sides of the loop coil 210.

However, further modifications of the coil elements 200 in the receiving coil 20 described below allow the length of the modified dipole 300 in the longitudinal direction to be longer than the interval between the two opposing sides of the loop coil 210. Note that, even in such modifications, the length of the modified dipole 300 in the longitudinal direction can be conventionally configured to be shorter than the half wavelength by being provided with the above-described parasitic element 320.

Figure 20:
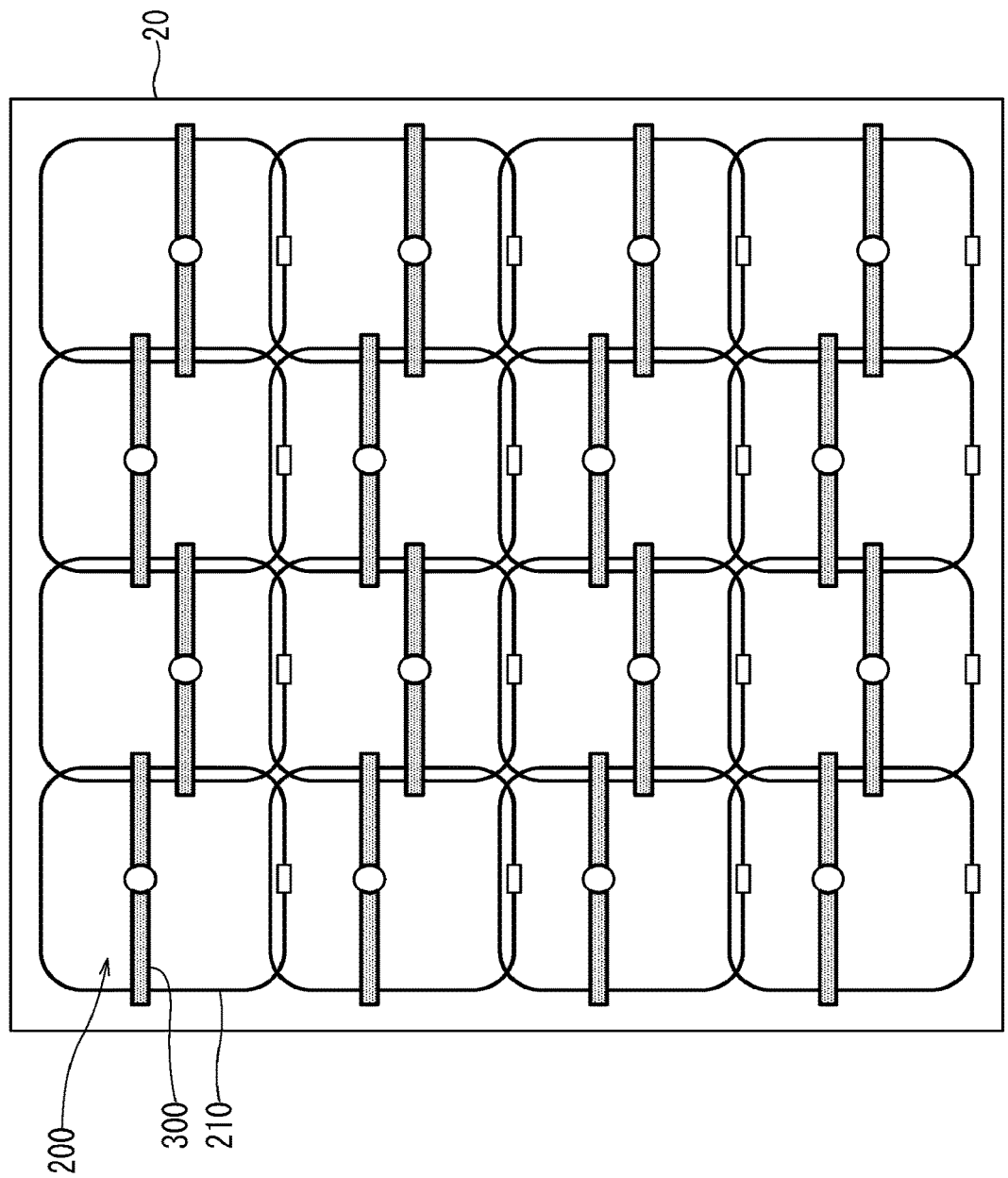
FIG. 20 is a plan view schematically illustrating an internal configuration of the receiving coil according to the first modification.

FIG. 20 is a plan view schematically illustrating an internal configuration of the receiving coil 20 according to the first modification. In the first modification, in any two horizontally adjacent coil elements 200 in FIG. 20, positions of the modified dipole 300 are vertically deviated from each other. Under this arrangement, even when the length of each modified dipole 300 in the longitudinal direction is longer than the interval between the two opposing sides of each loop coil 210, interference between adjacent coil elements 200 is prevented.

Figure 21:
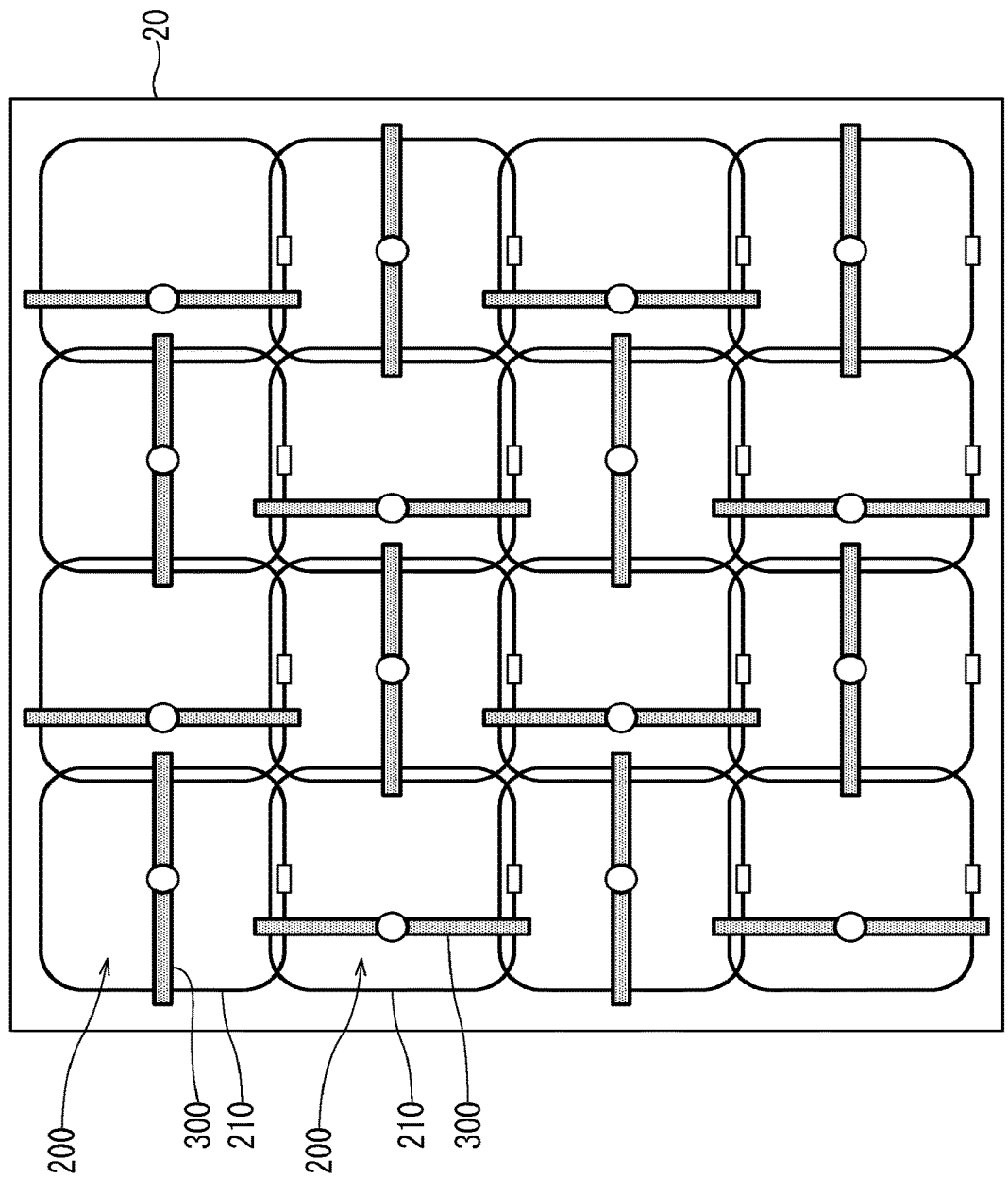
FIG. 21 is a plan view schematically illustrating an internal configuration of the receiving coil according to the second modification.

FIG. 21 is a plan view schematically illustrating an internal configuration of the receiving coil 20 according to the second modification. In the second modification, the orientation of the modified dipole 300 in the longitudinal direction is changed by 90° between any two coil elements 200 that are adjacent in the horizontal direction or in the vertical direction.

Figure 22:
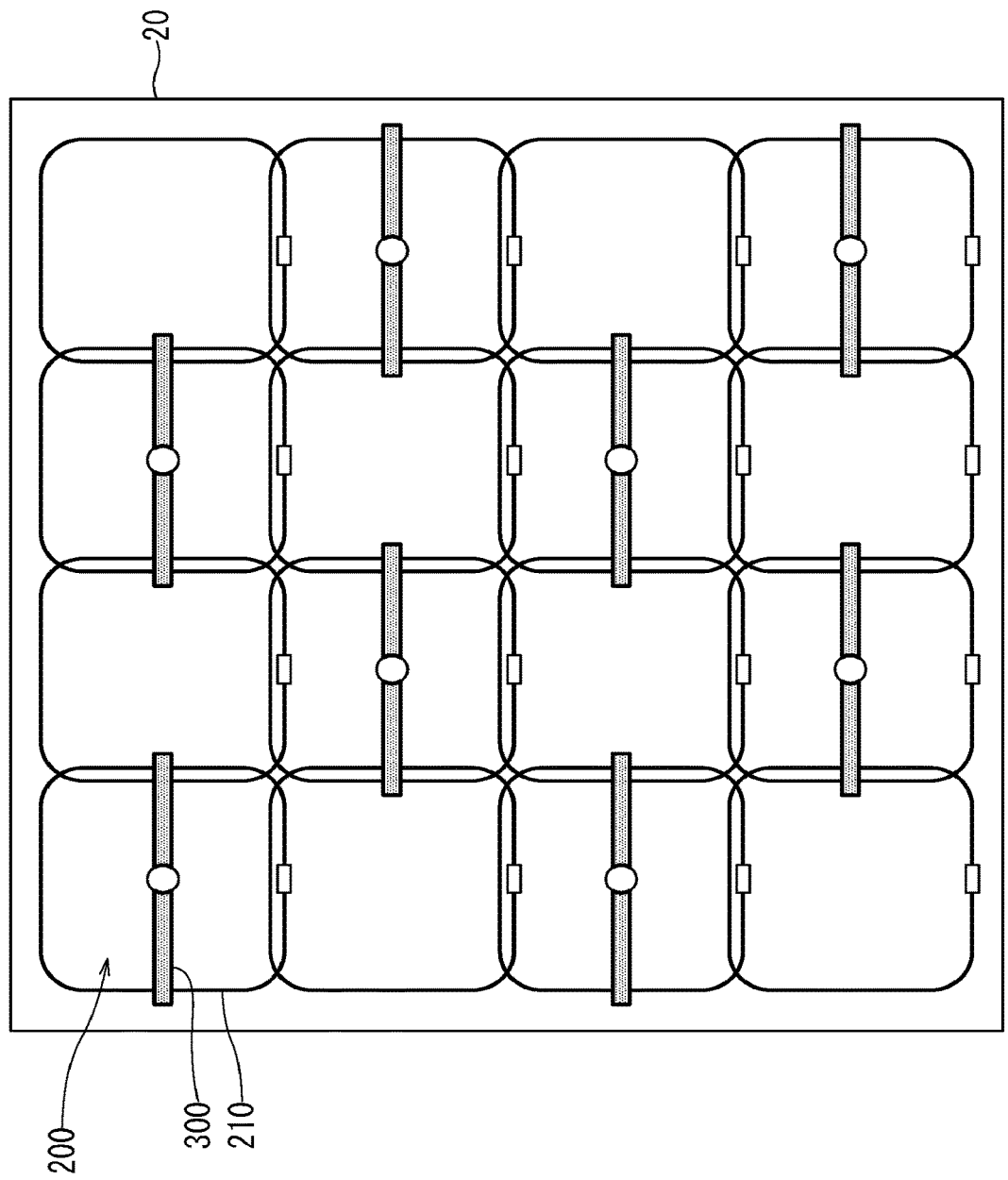
FIG. 22 is a plan view schematically illustrating an internal configuration of the receiving coil according to the third modification.

FIG. 22 is a plan view schematically illustrating an internal configuration of the receiving coil 20 according to the third modification. In the third modification, the coil elements 200 with the modified dipole 300 and the coil elements 200 without the modified dipole 300 are alternately arranged in the horizontal direction and in the vertical direction.

Figure 23:
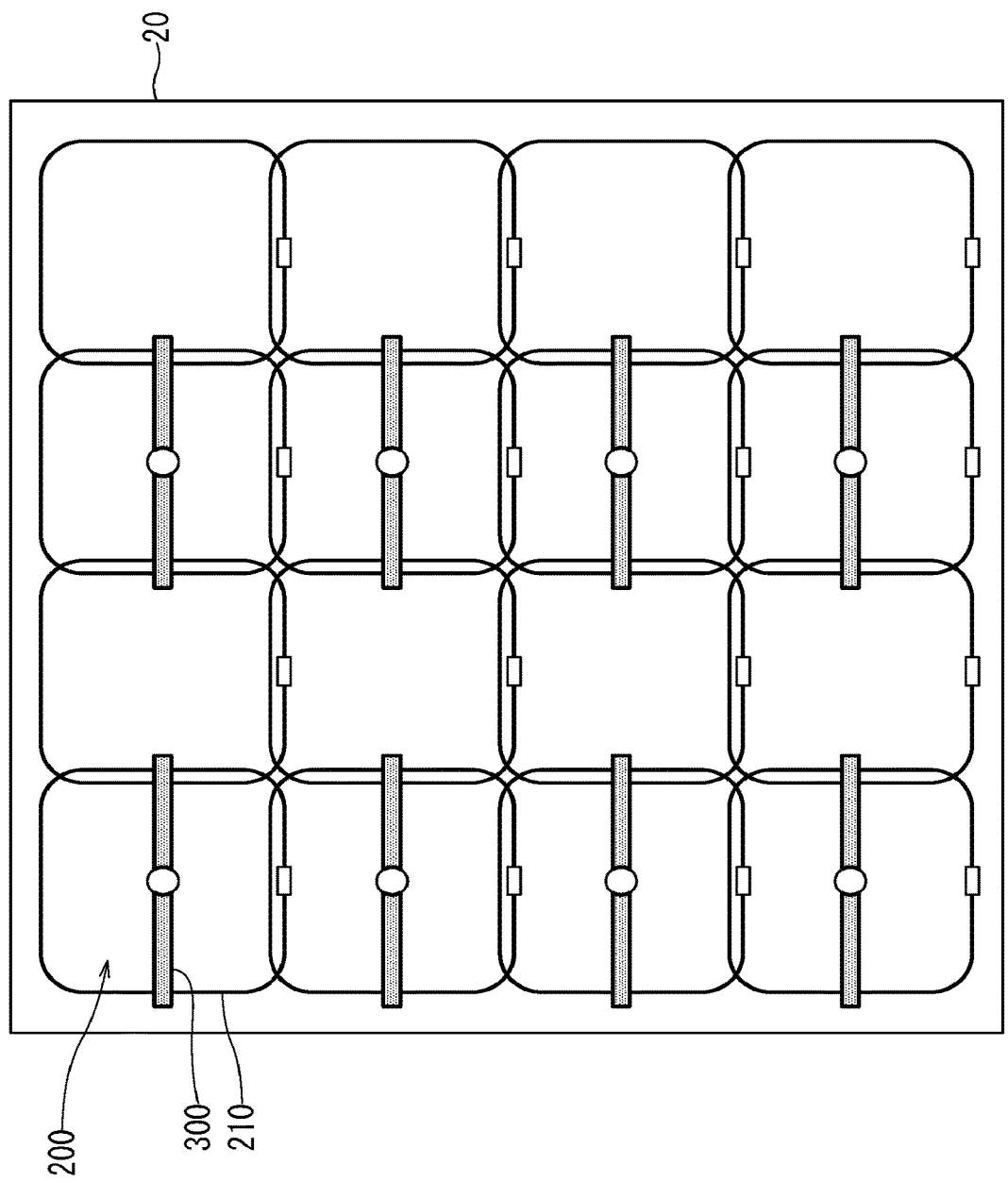
FIG. 23 is a plan view schematically illustrating an internal configuration of the receiving coil according to the fourth modification.

FIG. 23 is a plan view schematically illustrating an internal configuration of the receiving coil 20 according to the fourth modification. In the fourth modification, columns of the coil elements 200 with the modified dipole 300 and columns of coil elements 200 without the modified dipole 300 are alternately arranged.

Figure 24:
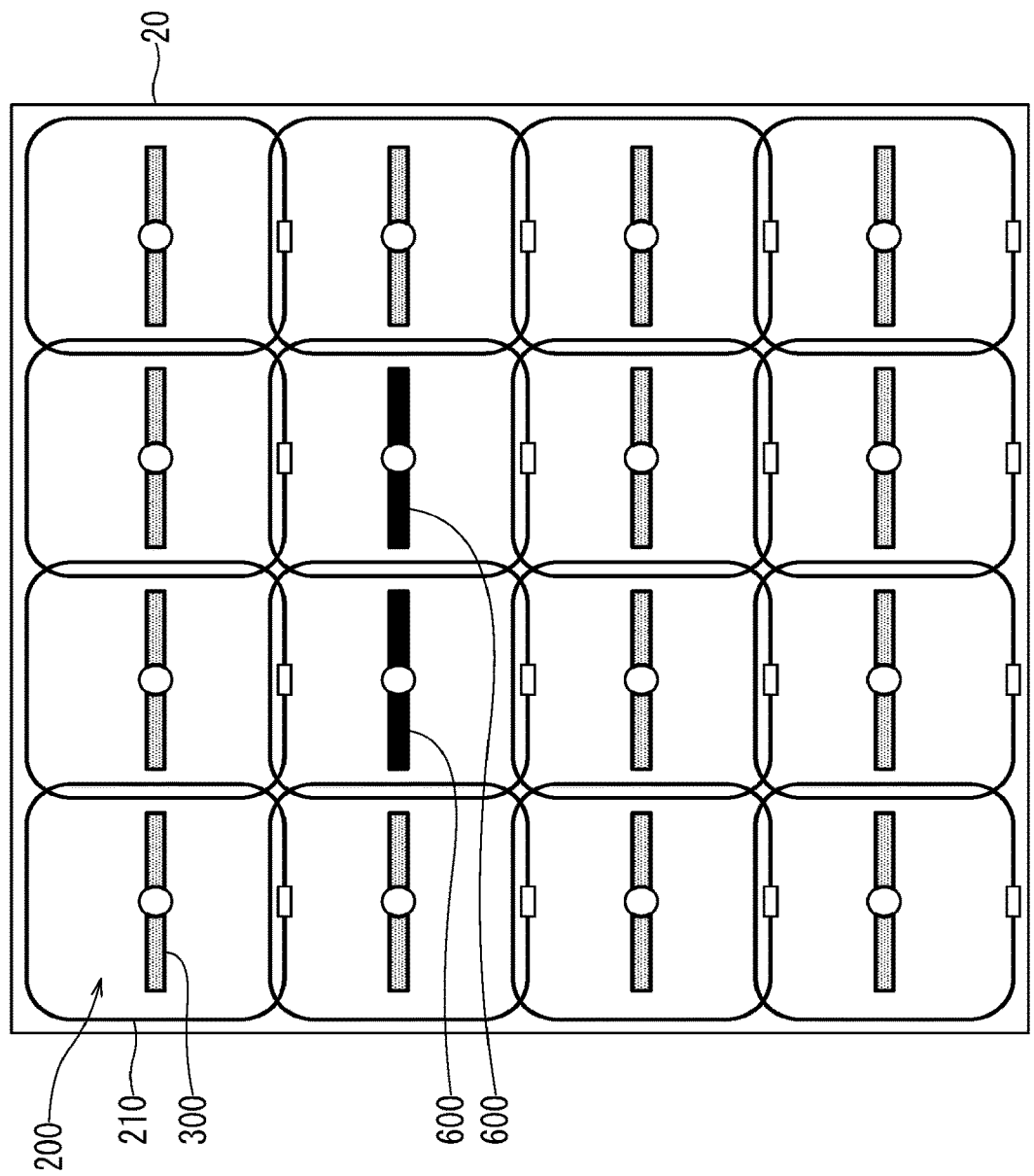
FIG. 24 is a plan view schematically illustrating an internal configuration of the receiving coil according to the fifth modification.

FIG. 24 is a plan view schematically illustrating an internal configuration of the receiving coil 20 according to the fifth modification. In the fifth modification, at least one coil element 200 in the receiving coil 20 includes a dipole antenna 600 for non-contact biological monitoring, which is different from the above-described modified dipole 300, whereas each of the rest of the coil elements 200 includes the modified dipole 300. The dipole antenna 600 for non-contact biological monitoring is an antenna configured to monitor human heartbeat and/or a respiratory motion in a non-contact manner as described in Japanese Unexamined Patent Application Publication No. JP 2021-159310 A, for example. The receiving coil 20 of the fifth modification has a configuration in which the respective modified dipoles 300 of two coil elements 200 in the receiving coil 20 illustrated in FIG. 3 are replaced by the two dipole antennas 600 for non-contact biological monitoring.

Figure 25:
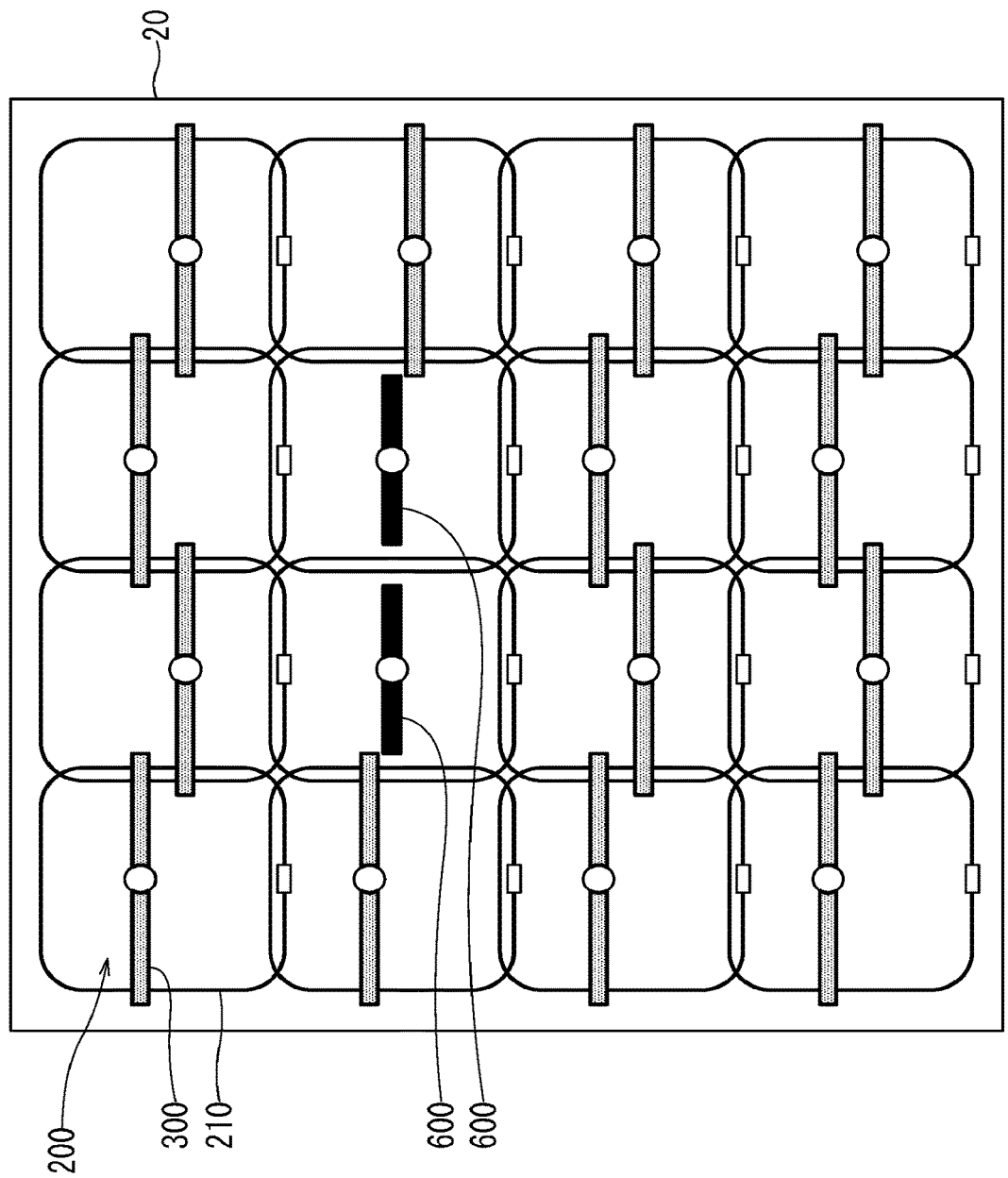
FIG. 25 is a plan view schematically illustrating an internal configuration of the receiving coil according to the sixth modification.

FIG. 25 is a plan view schematically illustrating an internal configuration of the receiving coil 20 according to the sixth modification. The receiving coil 20 of the sixth modification has a configuration in which the respective modified dipoles 300 of the two coil elements 200 in the receiving coil 20 illustrated in FIG. 20 are replaced by two dipole antennas 600 for non-contact biological monitoring.

According to the receiving coil of each embodiment described above, the gain of the receiving coil can be enhanced by using the combination of the loop coil and the receiving element other than the loop coil.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the scope of the invention as defined by the appended claims.

What is claimed is:
1. A receiving coil, comprising:
a plurality of coil elements, wherein:
at least one of the plurality of coil elements comprises a loop coil and a modified dipole disposed inside the loop coil;
the modified dipole comprises:
a main dipole configured to receive a radio-frequency (RF) signal and output a reception signal, and
a parasitic element that includes a split ring having a gap in part of a ring shape:
a length of a radiating element of the main dipole is shorter than half wavelength; and
the parasitic element is configured to function as a matching circuit for the main dipole.

2. The receiving coil according to claim 1, wherein
the main dipole has a ring-shaped portion, and
the ring-shaped portion and the split ring are coupled to each other by electromagnetic induction.

3. The receiving coil according to claim 1, wherein
the main dipole includes a ring-shaped portion, and
the main dipole and the parasitic element are arranged in such a manner that the ring-shaped portion and the split ring are coaxially stacked with a predetermined gap therebetween.

4. The receiving coil according to claim 1, wherein
the main dipole includes a ring-shaped portion, and
a read-out point of the ring-shaped portion of the main dipole is provided at a position where the gap of the split ring is rotated by approximately 180° around a central axis of the ring-shaped portion of the main dipole and the split ring.

5. The receiving coil according to claim 1, wherein the parasitic element and the main dipole are perpendicular to a same plane and have symmetrical structures with respect to respective center positions.

6. The receiving coil according to claim 1, wherein the main dipole and the parasitic element are perpendicular to a same plane and orthogonal to a same straight line on the same plane,
the main dipole is point-symmetric with respect to a first point on the same straight line, and
the parasitic element is point-symmetric with respect to a second point different from the first point on the same straight line.

7. The receiving coil according to claim 1, wherein
the main dipole is formed on one surface of a substrate, and
the parasitic element is formed on another surface of the substrate opposite to the one surface such that the parasitic element is insulated from a conductor of the main dipole.

8. The receiving coil according to claim 1, wherein the radiating element, which extends from a ring-shaped portion of the main dipole, is at least partially formed in a meander line in which a thin conductor is folded at a plurality of positions into a crank shape.

9. The receiving coil according to claim 1, wherein
the parasitic element includes two linear elements that extend in opposite directions from the split ring and are arranged in parallel with the radiating element of the main dipole, the parasitic element functions as a matching circuit for the main dipole, a capacitance component of the matching circuit is adjusted by a width of the linear elements and a size of the gap of the split ring, and an inductance component of the matching circuit is adjusted by a length of the linear elements.

10. The receiving coil according to claim 1, wherein:

the main dipole includes a ring-shaped portion from which the reception signal is outputted, and a plurality of radiating elements extending in both directions from the ring-shaped portion, and the main dipole is configured as a folded dipole antenna in which the radiating elements are folded, and both ends of the radiating elements face each other near the ring-shaped portion.

11. The receiving coil according to claim 10, wherein the parasitic element comprises a first parasitic element and a second parasitic element, a first split ring included in the first parasitic element is disposed to face the ring-shaped portion, and a second split ring included in the second parasitic element is disposed to face a position where both ends of the radiating elements face each other.

12. The receiving coil according to claim 10, wherein the radiating elements of the main dipole are formed as meander lines from the ring-shaped portion to both fold-back positions and from the both fold-back positions to the both ends facing each other, each of the meander lines being having a crank shape in which a thin conductor is folded at a plurality of positions.

13. The receiving coil according to claim 10, wherein the main dipole is formed on one surface of a substrate, the parasitic element is formed on another surface of the substrate opposite to the one surface such that the parasitic element is insulated from conductors of the main dipole, a particular radiating element of the radiating elements of the main dipole is formed as first linear elements with a predetermined length from the ring-shaped portion to first intermediate positions toward both fold-back positions, the particular radiating element of the main dipole is formed as meander lines from the first intermediate positions to the both fold-back positions and from the both fold-back positions to both ends facing each other, each of the meander lines having a shape in which a thin conductor is folded at a plurality of positions into a crank shape, the parasitic element extends from the split ring in opposite directions, is folded back at positions corresponding to the both fold-back positions of the particular radiating element, and is formed in a shape approximately similar to the radiating element such that both ends of the parasitic element face each other near the split ring, and the parasitic element is formed as second linear elements with a predetermined length from the split ring to both second intermediate positions toward both fold-back positions, and is formed as the meander lines from the second intermediate positions to both fold-back positions and from the both fold-back positions to both ends facing each other.

14. The receiving coil according to claim 13, wherein a length of the second linear element is adjusted depending on a frequency to be used.

15. The receiving coil according to claim 1, further comprising:

an output circuit that outputs a signal obtained by combining an output of the loop coil and an output of the modified dipole, and causes the receiving coil to function as a combined diversity coil, an output circuit that separately outputs an output of the loop coil and an output of the modified dipole, and causes the receiving coil to function as a region diversity coil having different sensitivity between a far field and a near field, or an output circuit that outputs an output of the loop coil and an output of the modified dipole as signals with different center frequencies, and causes the receiving coil to function as a frequency diversity coil.

16. An MRI apparatus comprising the receiving coil according to claim 1.

17. A receiving coil, comprising:

a plurality of coil elements, wherein at least one of the plurality of coil elements comprises a loop coil and a modified dipole disposed inside the loop coil;

the modified dipole comprises:

a main dipole configured to receive a radio-frequency (RF) signal and output a reception signal, and a parasitic element that includes a split ring having a gap in part of a ring shape, wherein the parasitic element includes two linear elements that extend in opposite directions from the split ring and are arranged in parallel with a radiating element of the main dipole.

18. The receiving coil according to claim 17, wherein a length of an entirety of the linear elements is shorter than a length of an entirety of the radiating element, the parasitic element functions as a wave director for the main dipole, and the modified dipole is enhanced in directivity in a direction from the main dipole toward the parasitic element.

19. A modified dipole, comprising:

a main dipole configured to receive a radio-frequency (RF) signal and output a reception signal, and a parasitic element that includes a split ring having a gap in part of a ring shape of the parasitic element, wherein a length of a radiating element of the main dipole is shorter than half wavelength; and the parasitic element is configured to function as a matching circuit for the main dipole.

* * * * *